(12) United States Patent
Hsia et al.

(10) Patent No.: US 11,772,323 B2
(45) Date of Patent: Oct. 3, 2023

(54) DIRECTED POLYMERIZATION METHOD TO GENERATE COMPLEX, THREE DIMENSIONAL (3D) STRUCTURES IN SOFT MATERIALS

(71) Applicants: Carnegie Mellon University, Pittsburgh, PA (US); Nanyang Technological University, Singapore (SG)

(72) Inventors: Kuen Jimmy Hsia, Pittsburgh, PA (US); Changjin Huang, Pittsburgh, PA (US); Subra Suresh, Singapore (SG)

(73) Assignees: CARNEGIE MELLON UNIVERSITY, Pittsburgh, PA (US); NANYANG TECHNOLOGICAL UNIVERSITY, Singapore (SG)

(*) Notice: Subject to any disclaimer, the term of this patent is extended or adjusted under 35 U.S.C. 154(b) by 310 days.

(21) Appl. No.: 16/766,417

(22) PCT Filed: Dec. 14, 2018

(86) PCT No.: PCT/SG2018/050614
§ 371 (c)(1),
(2) Date: May 22, 2020

(87) PCT Pub. No.: WO2019/117814
PCT Pub. Date: Jun. 20, 2019

(65) Prior Publication Data
US 2020/0376747 A1 Dec. 3, 2020

Related U.S. Application Data

(60) Provisional application No. 62/746,217, filed on Oct. 16, 2018, provisional application No. 62/708,588, filed on Dec. 14, 2017.

(51) Int. Cl.
*B29C 64/124* (2017.01)
*B33Y 10/00* (2015.01)
(Continued)

(52) U.S. Cl.
CPC .......... *B29C 64/124* (2017.08); *B29C 64/25* (2017.08); *B33Y 10/00* (2014.12); *B33Y 30/00* (2014.12);
(Continued)

(58) Field of Classification Search
CPC ....... B29C 64/124; B29C 64/25; B33Y 10/00; B33Y 30/00; B33Y 70/00; B33Y 80/00;
(Continued)

(56) References Cited

U.S. PATENT DOCUMENTS

2016/0233060 A1* 8/2016 Narendrnath ..... H01J 37/32871

FOREIGN PATENT DOCUMENTS

| KR | 20160113401 A | 9/2016 |
| WO | 2014126830 A2 | 8/2014 |

(Continued)

OTHER PUBLICATIONS

International Search Report and Written Opinion in related applicaiton PCT/SG2018/050614 dated Mar. 15, 2019.
(Continued)

*Primary Examiner* — Larry W Thrower
(74) *Attorney, Agent, or Firm* — Patterson + Sheridan, LLP

(57) ABSTRACT

There is provided a method of forming a 3-dimensional structure from a hydrogel, the process comprising the steps of: (a) placing a hydrogel polymerisation solution into a reaction vessel, and (b) allowing the hydrogel polymerisation solution to react without mixing for a period of time at ambient temperature, while introducing a polymerisation modulator to the reaction solution through a reaction solu-
(Continued)

tion/polymerisation modulator interface, wherein over the period of time, a modulation effect gradient is established in the reaction solution, where the modulation effect has a maximal value at the reaction solution/polymerisation modulator interface and a minimal value at a point furthest away from said interface. The said method additionally includes the use of physical constraint members such as wires and/or threads.

17 Claims, 11 Drawing Sheets

(51) Int. Cl.
| | |
|---|---|
| *B33Y 30/00* | (2015.01) |
| *B33Y 70/00* | (2020.01) |
| *B33Y 80/00* | (2015.01) |
| *B29C 64/25* | (2017.01) |
| *C08F 2/04* | (2006.01) |
| *C08F 20/06* | (2006.01) |
| *C08F 220/56* | (2006.01) |
| *C08F 222/02* | (2006.01) |
| *C08K 3/30* | (2006.01) |
| *C08K 5/17* | (2006.01) |
| *B29K 105/00* | (2006.01) |

(52) U.S. Cl.
CPC .............. *B33Y 70/00* (2014.12); *B33Y 80/00* (2014.12); *C08F 2/04* (2013.01); *C08F 20/06* (2013.01); *C08F 220/56* (2013.01); *C08F 222/02* (2013.01); *C08K 3/30* (2013.01); *C08K 5/17* (2013.01); *B29K 2105/0061* (2013.01); *C08K 2003/3054* (2013.01)

(58) Field of Classification Search
CPC .......... C08F 2/04; C08F 20/06; C08F 220/56; C08F 222/02; C08K 3/30; C08K 5/17; C08K 2003/3054; B29K 2105/0061
See application file for complete search history.

(56) References Cited

FOREIGN PATENT DOCUMENTS

| | | |
|---|---|---|
| WO | 2014126837 A2 | 8/2014 |
| WO | 2017075072 A1 | 5/2017 |

OTHER PUBLICATIONS

Guvendiren, M., et al., Swelling-Induced Surface Patterns in Hydrogels with Gradient Crosslinking Density. Adv. Funct. Mater., Oct. 5, 2009, vol. 19, 23-24; No. 19, pp. 3038-3045; [Retrieved on Feb. 13, 2019] <Doi: 10.1002/ADFM.200900622> Section 2, Results and Discussion and figures 1 and 2a.

Irvine, K. D. et al., Mechanical control of growth: ideas, facts and challenges. Development, Dec. 1, 2017, vol. 144, No. 23, pp. 4238-4248; [Retrieved on Feb. 13, 2019] <DOI :10.1242/DEV. 151902> Whole document particularly p. 4241, left column.

Manen, T., et al., Programming the shape-shifting of flat soft matter. Materials Today, Oct. 21, 2017, vol. 21, No. 2, pp. 144-163 [Retrieved on Feb. 13, 2019] <DOI: 10.1016/J.MATTOD.2017.08. 026>.

Huang, C., et al., Controlled molecular self-assembly of complex three dimensional structures in soft materials. PNAS, Jan. 2, 2018, vol. 115, No. 2, pp. 70-74; [Retrieved on Feb. 13, 2019] <DOI: 10.1073/pnas.1717912115>.

Huang, C., et al., Differential growth and shape formation in plant organs. PNAS, Nov. 19, 2018, vol. 115, No. 19, pp. 12359-12364; [Retrieved on Feb. 13, 2019] <DOI: 10.1073/pnas.1811296115>.

T. Mora, A. Boudaoud, Eur. Phys. J. E. Soft Matter 2006 20, 119-124.

M. J. Motala, et al., Extreme Meeh. Lett. 2015, 3, 8-16.

E. Epstein, et al., Small 2015, 11, 6051-6057.

Y. Klein, et al., Science 2007, 315, 1116-1120.

J. Kim, et al., Science 2012, 335, 1201-1205.

A. M. Abdullah, et al., Soft Matter 2016, 12, 6184-6195.

H. Lee, et al., Phys. Rev. Lett. 2012, 108, 214304.

A. S. Gladman, et al., Nat. Mater. 2016, 15, 413-418.

Chen Y, et al., (2011) I Proceedings 49th AIAA Aerospace Sciences Meeting Including the New Horizons Forum and Xerospace Exposition (American Institute of Aeronautics and Astronautics, Orlando, FL), 2011-1319.

S. J. Hepworth, et al., Phys. Med. Biol. 1999, 44, 1875-1884.

D. A. Markov, et al., Biomed. Microdevices 2014, 16, 91-96.

T. Tallinen, et al., Proc. Natl. Acad. Sci. USA 2014, 111, 12667-12672.

D. Biswal, J. Z. Hilt, Macromolecules 2009, 42, 973-979.

R. Weizbauer, et al., Front. Plant Sci. 2011, 2, 62.

S. Sauret-Gueto et al., PLoS Biology, 2013, 11, e1001550.

IPRP of the PCT application (PCT/SG2018/050614).

A. M. Abdullah, et al., Extreme Mech. Lett. 2016, 7, 34-41.

D. Dendukuri, et al., Nat. Mat. 2006, 5, 365-369.

\* cited by examiner

DIRECTED POLYMERIZATION METHOD TO GENERATE COMPLEX, THREE DIMENSIONAL (3D) STRUCTURES IN SOFT MATERIALS

CROSS-REFERENCE TO RELATED APPLICATIONS

The present application claims the benefit of U.S. Provisional Patent Application No. 62/708,588, filed on 14 Dec. 2017 and U.S. Provisional Patent Application No. 62/746,217, filed 16 Oct. 2018, both of which are incorporated in their entireties by reference herein.

FIELD OF INVENTION

The invention relates to a method to generate three dimensional structures in soft materials.

BACKGROUND

The listing or discussion of a prior-published document in this specification should not necessarily be taken as an acknowledgement that the document is part of the state of the art or is common general knowledge.

Living tissues of plants or animals form complex three-dimensional (3D) shapes and patterns to achieve their functions. For example, directional bending of plant stems in response to changes in the directions of light and gravity enables the leaves to improve their photosynthesis efficiency. Similarly, the formation of individual villi in human gut facilitates better absorption of nutrients. Tissue growth is a result of individual cell growth and/or cell proliferation during which new biomass is synthesized by consuming nutrients that are taken up locally in animals or plants and transported to other regions of their structures via vascular systems. In contrast to other growth mechanisms such as solidification of metals where growth is accomplished by adding newly solidified materials onto the surface, the continuous insertion of new biomass into existing structures makes living tissue growth a unique phenomenon. Furthermore, as the rate of tissue growth is dictated by the presence of growth factors, differential spatial growth in living tissues is possible with nonuniform distribution of growth factors enabled by intercellular transport. A direct consequence of the differential spatial growth is the emergence of internal mechanical residual stress, which influences tissue morphogenesis through the following two aspects. On one hand, the growth-induced residual stress may modulate biochemical signaling pathways and stabilize the regional distribution of growth factors, enabling further increase in the stress level. On the other hand, as the accumulated residual stress reaches a critical value, it may facilitate tissue morphogenesis by, e.g., mechanically buckling the tissue.

Differential growth of living tissues has been replicated in vitro primarily by the differential swelling of hydrogels [Tallinen T, et al., (2014) Proc Natl Acad Sci USA 111: 12667-12672; Mora T, Boudaoud A (2006) Eur Phys J E Soft Matter 20: 119-124; Motala M J, et al. (2015) Extreme Mech Lett 3: 8-16; Epstein E, et al. (2015) Small 11:6051-6057; Abdullah A M, et al. (2016) Extreme Mech Lett 7: 34-41]. Engineered heterogeneity by recourse to such approaches as spatially varying the degree of cross-linking [Motala M J, et al. (2015) Extreme Mech Lett 3: 8-16; Klein Y, et al. (2007) Science 315:1116-1120; Kim J, et al. (2012) Science 335: 1201-1205], adopting a multilayer design [Epstein E, et al. (2015) Small 11:6051-6057; Abdullah A M, et al. (2016) Extreme Mech Lett 7: 34-41; Abdullah A M, et al (2016) Soft Matter 12:6184-6195], or attaching the hydrogel to a rigid surface so as to impose a mechanical boundary constraint (Lee H, et al. (2012) Phys Rev Lett 108:214304), has often been introduced to achieve stable differential swelling. Three-dimensional printing of layered hydrogel with stiff cellulose fibrils aligned in the printing direction engenders controlled swelling that is shown to mimic the evolution of complex 3D architectures found in nature (Gladman A S, et al. (2016) Nat Mater 15:413-418). Despite their ability to generate 3D geometries, existing methods to produce complex shapes in soft materials differ fundamentally from the processes underlying tissue growth in the following distinct ways: (i) living tissues grow by adding new cells into existing cell aggregates, whereas no further polymerization is involved during controlled swelling of hydrogel; and (ii) the formation and swelling of hydrogels are two sequential processes in engineered systems, whereas in living systems, tissue growth and shape formation occur as a single, integrated process. In other words, existing methods to engineer complex 3D shapes through controlled swelling of hydrogels constitute a top-down approach; morphogenesis of living tissues, in contrast, is a bottom-up approach.

Examples of plant-inspired engineering systems include: super-hydrophobic surfaces designed with strategies drawn from the structure of the lotus leaf; self-repairing anti-fouling surfaces inspired by the pitcher plant; and actuation systems inspired by the Venus flytrap. Motivated by the wide variety and diversity of three-dimensional (3D) shapes of plant organs, much effort has been devoted to identifying the genetic and biomolecular pathways that regulate cell division and/or cell expansion as well as shape formation. Although specific genes dictate cell growth in a programmed manner, biomechanics also plays an essential and significant role in the formation of 3D shapes at the organ level. Compositional inhomogeneity of the constituent materials or the polarized intercellular transport of growth factors leads to inhomogeneous and non-uniform growth in various parts of plant organs such as leaf, stem, root, flower and fruit and, consequently, leads to mismatch of growth strain. In contrast to mammalian cells which can migrate to accommodate the need for extra spaces, the physical constraints in adjoining plant cell walls force adjacent cells to deform in a coordinated manner, facilitating the emergence of complex shapes.

A leaf blade or a flower petal mainly consists of two layers of mesophyll cells sandwiched between two layers of epidermis, with vascular veins lying in the median plane of the mesophyll. Differential cell expansion between the upper and lower sides of the mesophyll in response to environmental stimuli (e.g. temperature, light or humidity) is responsible for the repeated opening and closure of the flower. However, excessive cell growth within the marginal region plays a dominant role in the formation of saddle shapes and rippled edges in leaves and flower petals that open only once. Besides saddle shapes and localized ripples, helical growth represents another growth pattern commonly seen in nature. Direct correlation between the helical growth of stems and the helical pattern of microtubules has also been observed. In addition, cell wall composition could dictate the helical growth of plant cells. Our current state of understanding of the mechanisms of morphogenesis and shape evolution in plant organs is not sufficiently complete to conclude whether the observed helical pattern of microtubules or cells is the cause or consequence of the helical growth of the organ. In addition, the seemingly random evolution of twisting directions in some species points to the possibility of non-genetic factors influencing the emergence of helical growth of plant organs.

SUMMARY OF INVENTION

In a first aspect of the invention, there is provided a method of forming a 3-dimensional structure from a hydrogel polymerisation solution, the process comprising the steps of:
(a) placing a hydrogel polymerisation solution into a reaction vessel, where the hydrogel polymerisation solution comprises a solvent, a polymerisation initiator and:
a monomer, polymer or oligomer and a crosslinking agent chemically compatible with said monomer, polymer or oligomer; and/or
a polymer or oligomer suitable for self-crosslinking upon exposure to the polymerisation initiator; and
(b) allowing the hydrogel polymerisation solution to react without mixing for a period of time at ambient temperature, while introducing a polymerisation modulator to the reaction solution through a reaction solution/polymerisation modulator interface, wherein
over the period of time, a modulation effect gradient is established in the reaction solution, where the modulation effect has a maximal value at the reaction solution/polymerisation modulator interface and a minimal value at a point furthest away from said interface.

In embodiments of the first aspect of the invention:
(i) the reaction vessel may have a hydrophobic surface, optionally wherein one or more regions of the surface may be modified to provide a hydrophilic surface;
(ii) the reaction vessel may have a hydrophilic surface, optionally wherein one or more regions of the surface may be modified to provide a hydrophobic surface;
(iii) the polymerisation modulator may be a chemical modulator of the hydrogel polymerisation and the modulation effect gradient may be a concentration gradient of the chemical modulator, optionally wherein the chemical modulator may be one or more of the group selected from oxygen, a quinone, a phenol, a nitro-containing aromatic compound, a nitroso-containing aromatic compound, iodine or sulphur (e.g. the chemical modulator may be oxygen);
(iv) the polymerisation modulator may be a temperature at least 10° C. above or below an initial ambient temperature of the polymerisation solution and the modulation effect gradient may be a temperature gradient;
(v) the monomer may be selected from one or more of the group selected from an acrylamide, itaconic acid, 2-acrylamido-2-methylpropane sulfonic acid, a methacrylate, and a methyl ether methacrylate;
(vi) the polymer or oligomer suitable for crosslinking upon exposure to a polymerisation initiator may be selected from one or more of the group consisting of a poly(ethylene glycol diacrylate), a poly(ethylene glycol dimethacrylate), an oligo(ethylene glycol diacrylate), and an oligo(ethylene glycol dimethacrylate), optionally wherein the polymer or oligomer for reaction with a crosslinking agent may be selected from oligo(ethylene glycol) methyl ether methacrylate or poly(ethylene glycol) methyl ether methacrylate;
(vii) the crosslinking agent, when present, may be selected from a bisacrylamide, a bisacrylate, and a bismethylate;
(viii) in the hydrogel polymerisation solution, the weight:weight ratio of the monomer, polymer or oligomer: crosslinking agent may be from 10:1 to 500:1 w/w, such as from 50:1 to 250:1 w/w, such as from 75:1 to 150:1 w/w, such as about 100:1 w/w;
(ix) the hydrogel formed from the hydrogel polymerisation solution may be selected from one or more of the group consisting of polyacrylamide, poly(2-acrylamido-2-methyl-1-propanesulfonic acid), poly(itaconic acid), poly(2-acrylamido-2-methyl-1-propanesulfonic acid-co-itaconic acid), poly(2-acrylamido-2-methyl-1-propanesulfonic acid-co-acrylamide), a poly(ethylene glycol diacrylate), a poly(ethylene glycol dimethacrylate), and poly(oligo(ethylene glycol) methyl ether methacrylate-co-2-(2-methoxyethoxy) ethyl methacrylate);
(x) one or more hydrophilic physical constraint members may be added to the reaction vessel in step (a), wherein the hydrophilic physical constraint member reduces the growth of polymer in step (b) in a region abutting or adjacent to the hydrophilic physical constraint member. Examples of hydrophilic physical constraint members that may be mentioned herein include a polymeric wire (e.g. a material that is stiffer relative than the hydrogel, such as PDMS), or more particularly, a thread, a wire or a combination thereof;
(xi) the reaction vessel may have a surface and one or more regions of the surface may be treated with a chemical constraint material that reduces or completely inhibits the growth of polymer in step (b) on or adjacent to each region of the surface so treated by forming a covalent bond with a growing polymeric material, optionally wherein the chemical constraint material provides the surface region of the reaction vessel with a functional group selected from an aldehyde, a thiol or an acrylate;
(xii) the reaction vessel may be formed from one or more of a glass and a polymeric material (e.g. the polymeric material is polydimethylsiloxane), optionally wherein a bottom surface of the reaction vessel may be formed by a glass substrate and one or more reaction vessel walls may be formed by polydimethylsiloxane;
(xiii) the product of step (b) may be further subjected to hydration with water to form a final, hydrated product;
(xiv) the product obtained may have a three-dimensional shape that mimics that of a biological tissue, optionally wherein the three-dimensional shape mimics a blood vessel, a plant stem, a leaf and a lung tissue.

In a second aspect of the invention, there is provided a product obtained or obtainable by a process as described in the first aspect of the invention, and any technically sensible combination of its embodiments.

BRIEF DESCRIPTION OF DRAWINGS

Certain embodiments of the present disclosure are described more fully hereinafter with reference to the accompanying drawings.

DESCRIPTION

Figure 1:
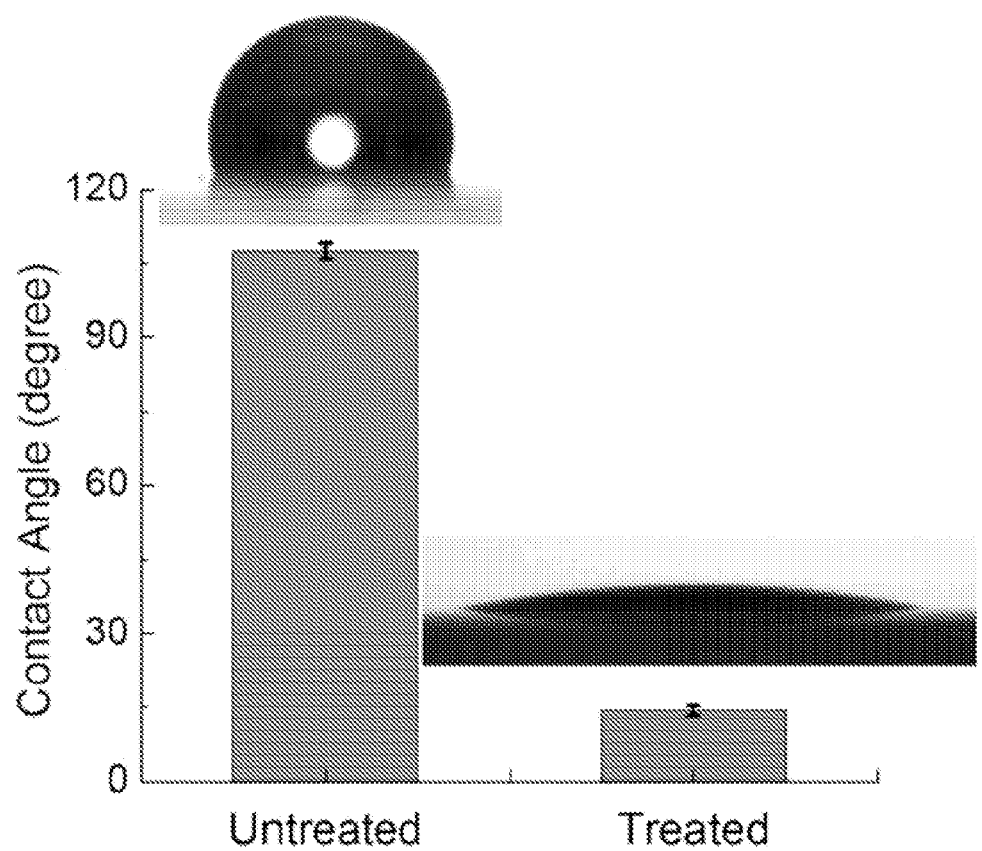
FIG. 1. Measurements of the wetting angles of gel solution on PDMS surface with and without plasma treatment.

The current invention relates to a new methodology for the formation of 3-dimensional hydrogel structures, where the eventual 3-dimensional structures obtained are only limited by the imagination of the user of the method. In its simplest form, the method applies a modulator to a hydrogel polymerisation solution in such a way that differential modulation of the polymerisation is achieved. This differential modulation may also be aided by other constraints, such as physical or chemical constrains, that help to shape the growing hydrogel into the shape desired by the user. Thus, in the first instance, the current invention relates to a method of forming a 3-dimensional structure from a hydrogel polymerisation solution, the process comprising the steps of:
(a) placing a hydrogel polymerisation solution into a reaction vessel, where the hydrogel polymerisation solution comprises a solvent, a polymerisation initiator and:
a monomer, polymer or oligomer and a crosslinking agent chemically compatible with said monomer, polymer or oligomer; and/or
a polymer or oligomer suitable for self-crosslinking upon exposure to the polymerisation initiator; and
(b) allowing the hydrogel polymerisation solution to react without mixing for a period of time at ambient temperature, while introducing a polymerisation modulator to the reaction solution through a reaction solution/polymerisation modulator interface, wherein
over the period of time, a modulation effect gradient is established in the reaction solution, where the modulation effect has a maximal value at the reaction solution/polymerisation modulator interface and a minimal value at a point furthest away from said interface In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

When used herein, "hydrogel" refers to a 3-dimensional network of hydrophilic polymer chains held together by crosslinks between said chains. The resulting polymeric network can absorb a significant amount of water (e.g. in some cases the percentage weight of water in fully water-saturated hydrogel can be over 90 wt %). Given the high degree of water absorption, hydrogels also possess a degree of flexibility very similar to natural tissue.

When used herein the term "polymerisation initiator" means a material that can provide a chemical species that can react with a monomer, to form an intermediate compound capable of linking successively with a large number of other monomers to form a polymeric compound. In the context of the current invention, the polymerisation initiator may also be capable of re-initiating the chain-growth of an oligomer or polymer and/or crosslinking as well. The polymerisation initiator(s) chosen for inclusion in the hydrogel polymerisation solution will depend on the monomers, oligomers and polymers selected. As such, the choice can be readily determined by a person skilled in the art based on the materials chosen to form the hydrogel. Suitable polymerisation initiators that may be mentioned herein include, but are not limited to, an azo compound (e.g. 1,1'-azobis(cyclohexanecarbonitrile and azobisisobutyronitrile), an inorganic peroxide (e.g. ammonium, sodium or potassium persulfate, and hydroxymethanesulfinic acid monosodium salt dihydrate), an organic peroxide (e.g. tert-Butyl hydroperoxide, benzoyl peroxide and the like), an organic photoinitiator (e.g. acetophenone, benzophenone, benzil and benozoin compounds, thioxanthones and cationic photoinitiators) and combinations thereof.

While the polymerisation initiator may be used alone, it may be used in combination with a suitable initiator catalyst. An example of a suitable polymerisation initiator catalyst that may be used in combination with a persulfate (e.g. ammonium persulfate) is tetramethylethylenediamine.

When used herein "crosslinking agent" refers to a material that is capable of forming a covalent bond between at least two or more polymeric chains (e.g. 2, 3, 4 or 5, such as 2). More particularly, the crosslinking agent may be a material that does not terminate the polymerisation chain-extension process and so more than one crosslinking agent may be incorporated into the growing polymeric chain, thereby allowing a single chain to link to more than one other polymeric chain and thereby enabling the formation of a 3-dimensional network between said polymer chains. In the context of the current invention, "crosslinking agent" is used to refer to a material that is initially provided to the hydrogel polymerisation solution as a separate component. That is, the crosslinking agent is not covalently bonded to any other material. In contrast, the term "polymer or oligomer suitable for self-crosslinking" refers to polymeric or oligomeric materials that comprise functional groups that can react with compatible functional groups on a separate polymeric or oligomeric chain to form a covalent bond, thereby crosslinking the chains together.

Suitable crosslinking agents that may be mentioned in relation to the current invention include, but are not limited to a bisacrylamide, a bisacrylate, a bismethylate and combinations thereof. It will be appreciated that the amount of crosslinking agent added will depend on the type of hydrogel that is desired. As such, the amount of crosslinking agent added can be determined by the skilled person based on the properties desired in the eventual hydrogel. An example of a suitable amount of monomer, polymer or oligomer: crosslinking agent is from 10:1 to 500:1 w/w, such as from 50:1 to 250:1 w/w, such as from 75:1 to 150:1 w/w, such as about 100:1 w/w.

When only a single monomeric material is included in the hydrogel polymerisation solution, the crosslinking agent and polymerisation initiator are chosen to be compatible with the monomeric material. However, as will be appreciated, two or more (e.g. 2, 3, 4 or 5) monomeric materials may be present. In the case where the monomeric materials are compatible with one another (so as to form a random copolymer), then the crosslinking agent and polymerisation initiator will also be compatible with all of the materials used.

Suitable monomers that may be used in the hydrogel polymerisation solution include, but are not limited to, an acrylamide, itaconic acid, 2-acrylamido-2-methylpropane sulfonic acid, a methacrylate, a methyl ether methacrylate and combinations thereof.

As noted above, in addition to (or in place of) monomers, the hydrogel polymerisation solution may contain one or more oligomers and/or one or more polymers that are either capable of further polymerisation or crosslinking in the presence of a suitable polymerisation initiator. No particular limitation is placed on the oligomers and polymers that may be used, as such each oligomer or polymer in the hydrogel polymerisation solution may be a homopolymeric/oligomeric material or it may be a co-polymeric/oligomeric material.

When such oligomers and polymers are used in combination with a compatible monomer(s), block co-polymers may be formed when the monomer in the hydrogel polymerisation solution is different to the monomer(s) that generated the oligomer(s)/polymer(s).

Suitable polymers and oligomers that may be used in the current invention include, but are not limited to, oligo(ethylene glycol) methyl ether methacrylate, poly(ethylene glycol) methyl ether methacrylate, and combinations thereof. As will be appreciated, the above oligomer and polymer can be crosslinked when exposed to a separate crosslinking agent.

In particular embodiments of the invention, the hydrogel polymerisation solution may comprise one or more polymers and/or one or more oligomers that are capable of self-crosslinking upon exposure to a compatible polymerisation linker. Details of suitable self-crosslinking oligomers and polymers are provided below. These polymers and oligomers may be used alone or in combination with the monomers, polymers and oligomers mentioned above (which require the inclusion of a separate crosslinking agent). In cases where the oligomers and polymers used are compatible with each other, then block copolymers may be formed in a single 3-dimensional network. It is noted that the self-crosslinking polymers/oligomers may be used in combination with the monomers, oligomers, polymers and combinations thereof discussed above to generate other copolymers and blends of materials.

Polymers and oligomers suitable for crosslinking upon exposure to a polymerisation initiator include, but are not limited to, a poly(ethylene glycol diacrylate), a poly(ethylene glycol dimethacrylate), an oligo(ethylene glycol diacrylate), an oligo(ethylene glycol dimethacrylate) and combinations thereof.

As will be appreciated, any suitable combination of the monomers, oligomers and polymers disclosed herein is contemplated. Such combinations may be used to provide the eventual hydrogel with particularly desired properties (e.g. mechanical strength and the like). In alternative embodiments, each of the materials mentioned above may be used individually. The skilled person is capable of selecting suitable materials to obtain the desired physical properties that they want for the eventual hydrogel.

Examples of suitable hydrogels that may be formed include, but are not limited to, polyacrylamide, poly(2-acrylamido-2-methyl-1-propanesulfonic acid), poly(itaconic acid), poly(2-acrylamido-2-methyl-1-propanesulfonic acid-co-itaconic acid), poly(2-acrylamido-2-methyl-1-propane-sulfonic acid-co-acrylamide), a poly(ethylene glycol diacrylate), a poly(ethylene glycol dimethacrylate), and poly(oligo(ethylene glycol) methyl ether methacrylate-co-2-(2-methoxyethoxy) ethyl methacrylate). As will be appreciated, the formed hydrogels may take any of the forms discussed above and so may also include interpenetrating polymer networks of two or more of the polymers discussed above. For completeness, it will be appreciated that the polymers listed above are necessarily crosslinked if they form the whole or part of a hydrogel's 3-dimensional network.

When used herein "polymerisation modulator" refers to a chemical or a form of energy (e.g. in the form of heat transfer by temperature differential) that can be used to increase or decrease polymerisation in the hydrogel polymerisation solution.

In the context of the current invention, when the polymerisation modulator is in the form of a chemical, then the hydrogel polymerisation solution is substantially free of that material at the initiation of step (a). When used herein "substantially free" means that the concentration of the modulator material is less than 1 wt %, such as less than 0.01 wt %, or less than 0.0001 wt % in the initial hydrogel polymerisation solution used in step (a) above.

For example, in a typical reaction set-up using a modulating gas (e.g. oxygen, which is known to inhibit certain polymerisation reactions), the hydrogel polymerisation solution is placed in a reaction vessel exposed to air (or pure oxygen), thereby establishing a gas-solution interface at the surface of the hydrogel polymerisation solution. Any suitable method for removing oxygen from the solvent and other components may be used. For example, in order to remove oxygen, the solvent may be placed in a vacuum dessicator for a period of time (e.g. 30 minutes) to ensure that at least the solvent is substantially (e.g. completely) free of dissolved oxygen gas. In an alternative arrangement, the hydrogel polymerisation solution excluding the initiator compounds may be subjected to the same treatment, followed by subsequent addition of the initiator compounds. Given that the amount of oxygen gas dissolved in the solvent may be relatively low at any given time, another alternative is to select the amount of initiator provided to be sufficient to remove the oxygen gas initially present in the hydrogel polymerisation solution and enable initiation of the polymerisation reaction, thereby allowing the resulting inhibition to be controlled by the diffusion of oxygen from air. In yet a further alternative, oxygen in the solvent or hydrogel polymerisation solution may be substantially removed by bubbling an inert gas through the solvent/solution (e.g. nitrogen or argon) for a suitable period of time at a suitable flow rate (as readily determined by a person skilled in this field). Over time, once the hydrogel polymerisation solution is exposed to oxygen/air, oxygen diffuses into the hydrogel polymerisation solution and a concentration gradient of oxygen is established, where the concentration of oxygen is greatest at the gas-solution interface and at its least at the further point away from said interface. Given this arrangement, oxygen is able to inhibit polymerisation most effectively closest to the surface of the hydrogel polymerisation solution, but is less able to inhibit polymerisation as the distance from the surface of the hydrogel polymerisation solution increases, enabling differential polymerisation growth rates.

As will be appreciated, a similar interface may be established if a liquid is used, where a liquid containing a modulator (either as a solution or in pure, liquid form) may be applied at one or more points in a dropwise/controlled addition fashion to the surface of the reaction vessel (or through inlets in the reaction vessel) to establish one or more concentration gradients that inhibit/increase the degree of polymerisation by the establishment of a concentration gradient over time. Thus, as is derivable from the above discussion, when the polymerisation modulator is a chemical modulator of the hydrogel polymerisation, then the modulation effect gradient referred to above is a concentration gradient of the chemical modulator.

Suitable chemical modulators that may be mentioned herein include, but are not limited to, oxygen, a quinone, a phenol, a nitro-containing aromatic compound, a nitroso-containing an aromatic compound, iodine, sulphur and combinations thereof. In particular embodiments of the invention, when a chemical modulator is present, it may be oxygen. It is believed that the chemical modulators mentioned herein act by inhibiting polymer chain growth.

In the context of the current invention, when the polymerisation modulator is a form of energy transfer such as heat transfer, the modulation effect is somewhat different. This is because there is no concentration gradient of a material. Instead, as will be appreciated, a hydrogel polymerisation solution will have an ambient temperature and so when used herein the application of heat transfer relates to the application of a source of heat or cold that is has a higher or lower temperature, respectively, than the initial ambient temperature of the hydrogel polymerisation solution. In simple embodiments of the invention, the application of heat or cold may be accomplished by application of a heating or cooling element to a wall of the reaction vessel, which in this case acts as the reaction solution/polymerisation modulator interface. It is noted that the effect on temperature can be very complicated, because it may not only affect the rate of free radical generation, but also alter the diffusion of radicals and monomers/cross-linkers. Nevertheless, it is believed that the application of a source of heat to the hydrogel polymerisation solution will result in increased polymerisation closer to the heat source/solution interface, with less polymerisation taking place further away from the heat source/solution interface. On the other hand, it is believed that the opposite will be the case where a cooling source is applied, such that reactants present in the hydrogel polymerisation solution closest to the cooling source/solution interface will undergo less polymerisation than reactants in the hydrogel polymerisation solution further away from said interface. As will be appreciated by the descriptions above, when a heating or cooling source is applied, then the modulation effect gradient is a temperature gradient.

As indicated above, the energy transfer may be in the form of a heating or cooling source, which generates a temperature gradient. This heating or cooling source may supply a temperature that is at least 10° C. above or below the initial ambient temperature of the hydrogel polymerisation solution. As will be appreciated, the initial ambient temperature of the hydrogel polymerisation solution may match the initial ambient temperature of the environment in which the hydrogel polymerisation solution is situated before the application of the heat and/or cooling sources. As such, the components of the hydrogel polymerisation solution may be placed in the desired ambient environment and allowed to equilibrate to the temperature of the ambient environment before being combined together to form the hydrogel polymerisation solution.

As will be appreciated, it is possible to combine temperature modulation with chemical modulation, if desired.

The solvent used in the hydrogel polymer solution may be any suitable solvent capable of allowing the polymeric growth of a hydrogel. As such, it must be compatible with the other components of the hydrogel polymerisation solution. Examples of suitable solvents include, but are not limited to, water.

The reaction vessel may be any suitable vessel and may have any suitable size and volume depending on the desired shape and size of the resulting hydrogel. In this regard, it is noted that the reaction vessel needs to be of a size and shape that can accommodate the hydrogel polymerisation solution. However, as disclosed in the examples, the resulting hydrogel may actually have dimensions greater than that of the reaction vessel. As will be appreciated, the reaction vessel will have at least one surface that is in contact with the hydrogel polymerisation solution during the formation of the hydrogel. There may only be one surface, or there may be multiple surfaces depending on how the reaction vessel is configured. For example, there may be a flat base portion attached to a cylindrical vertical wall. However, no particular limitation is placed on the design and composition of the reaction vessel, except that it should be a vessel that does not react with any of the components of the hydrogel polymerisation solution or the modulators applied thereto. Examples of suitable materials that may form the whole or part of a reaction vessel include, but are not limited to, a plastic (e.g. polystyrene), a glass, a polymeric material (e.g. the polymeric material is polydimethylsiloxane) and combinations thereof. For example, a bottom surface of the reaction vessel may be formed by a glass substrate and one or more reaction vessel walls may be formed by polydimethylsiloxane (PDMS). The arrangement in this example may be useful in prototyping a reaction vessel because it is easy to customize the shape and size of the reactor. In addition, PDMS can be easily attached on a glass surface by gently pressing the PDMS against the glass and results in a reaction vessel that does not leak because the points of attachment are well-sealed.

While ordinary glass is reasonably hydrophilic in nature (being made primarily from a silicate material), polydimethylsiloxane or some glasses or other substances that may be used to create the whole or part of the reaction vessel may have a relatively hydrophobic surface. When used herein a "hydrophobic surface" is considered to be any surface that a contact angle larger than 90 degrees ($90°<\theta<180°$), as measured using the test described below in the examples section. When used herein a "hydrophilic surface" is considered to be any surface that a contact angle smaller than 90 degrees ($0°<\theta<90°$), as measured using the test described below in the examples section. References to "hydrophobic" and "hydrophilic" may be interpreted accordingly herein.

As will be appreciated, the shape of the reaction vessel will have an impact on the shape of the hydrogel that is prepared from it. In addition, the hydrophilic/hydrophobic nature of the surface(s) of the reaction vessel can also have an effect on the resulting hydrogel product. This is shown in the examples, where varying the degree of hydrophilicity of the side-walls of the reaction vessel (made from PDMS) resulted in the formation of a bowl-shaped hydrogel or a ring- or tube-shaped hydrogel—see FIGS. 2 and 3, and Example 1 below. As will be appreciated, it is possible to modify the whole or part of the surface of a reaction vessel by chemical modification of the surface to change the hydrophobic/hydrophilic of said surface. For example, while PDMS is hydrophobic, it is possible to subject PDMS to treatment with plasma from a plasma cleaner to activate the surface and make it hydrophilic, as discussed in more detail below in Example 1. As will be appreciated, while it is possible to make the entire surface of the reaction vessel more hydrophilic, it is possible to modify only part of the surface through the use of a mask (e.g. covering areas to retain their original properties with a PDMS thin-film during plasma treatment).

Thus, in embodiments of the invention, wherein the reaction vessel has a hydrophobic surface, one or more regions of the reaction vessel surface can be modified to provide a hydrophilic surface (e.g. by plasma treatment as mentioned above). Similarly, in embodiments of the invention, the reaction vessel has a hydrophilic surface, one or more regions of said surface can be modified to provide a hydrophobic surface. For the avoidance of doubt, an untreated reaction vessel may have more than one surface, with each surface independently selected to be a hydrophobic or hydrophilic surface in an untreated state. If it is desired to modify the hydrophobic/hydrophilic properties of these untreated surfaces in whole or part, then the treatments outlined above may be used. In the case where only part of the surfaces are to be treated, the areas of the surfaces that are not to be treated may be covered by a masking material to retain their original properties, while allowing the region to be treated to obtain modified surface properties.

Without wishing to be bound by theory, it is believed that the surface hydrophobicity of the wall has a significant impact on the meniscus profile of the hydrogel polymerisation solution in the reaction vessel (whether globally or in a part of the vessel) and this consequently modulates the polymerization process, as demonstrated in Example 1 below.

In order to obtain more complex shapes from the process outlined above, it is possible to include hydrophilic physical constraint members and/or chemical restraint materials to the reaction vessel.

When used herein, "physical constraint member" relates to the introduction of a shaped physical object to the reaction vessel that is hydrophilic in nature and so influences the polymerisation reaction occurring in the hydrogel polymerisation solvent at a location adjacent to and/or in direct contact with said member. As such, the physical constraint member may be introduced as an entity that is entirely separate from the reaction vessel or it may also be introduced as a protrusion that extends from one or more walls of the reaction vessel. As will be appreciated, one or more of each variant of the physical constraint member may be used in the process described herein.

In general, the use of one or more hydrophilic physical constraint members to the reaction vessel is intended to reduce the growth of the polymer in step (b) of the process in a region that abuts (i.e. directly contacts) or is adjacent to the hydrophilic physical constraint member. As will be appreciated, if the hydrophilic physical constraint member comprises a heat-conducting material (e.g. a metal wire), the effects of the hydrophilic physical constraint member may be enhanced or attenuated by attaching a source of cold or heat, respectively, to said member, thereby potentially providing the ability to more finely control the degree of constraint provided by the physical constraint members.

The physical constraint members mentioned herein may be provided in any suitable shape and size, provided that the shape and size is able to reduce the growth rate of the polymer in the solution in its immediate vicinity (i.e. polymer chains in direct contact with the member or in a region close to said member). Suitable physical constraint members may be in the form of threads, wires and, potentially, electronic circuits (e.g. flexible electronic circuits) separate to or protruding from one or more reaction vessel walls. It will be appreciated that attaching a flexible member (e.g. a thread or flexible electronic circuit) to at least two parts of a reaction vessel (or a wire protruding from one wall of a reaction vessel) may enable orientations not possible by simple direct placement of a thread wire into the reaction vessel, with these additional orientations enabling greater design freedom and flexibility for the final products of the process. For more rigid members, it will be appreciated that only one point of attachment to a wall of the reaction vessel is needed.

Figure 11:
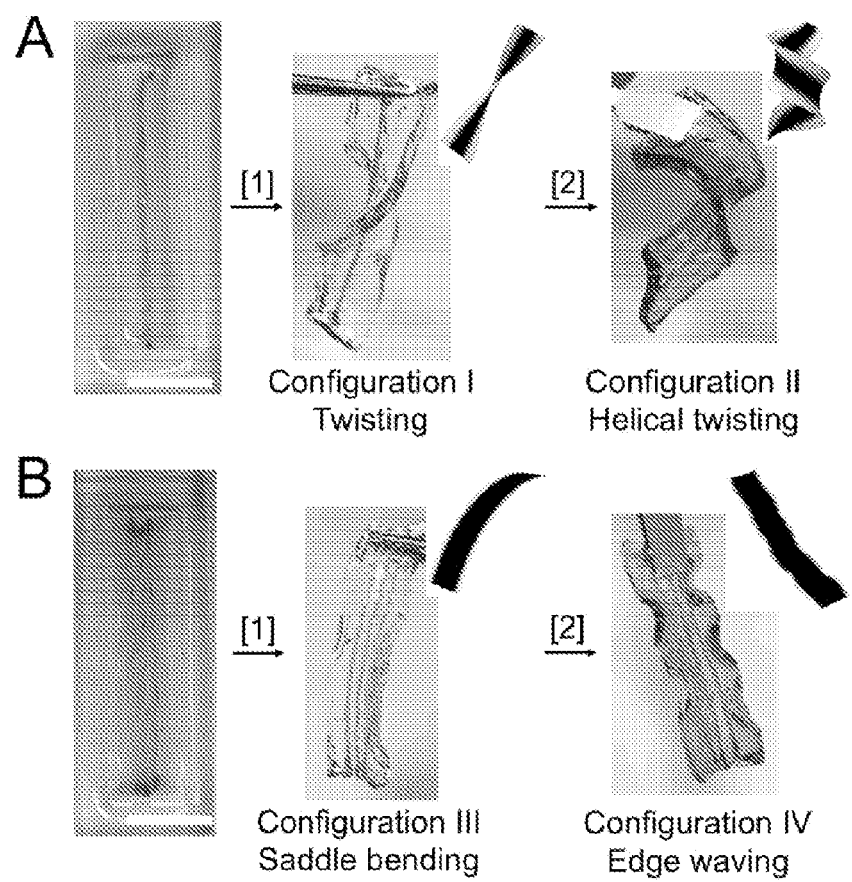
FIG. 11. Reproduction of the four 3D configurations of leaves: (A) twisting and helical twisting; (B) saddle bending and edge waving. Insets are contour plots of normalized growth strain profile ($\varepsilon_g/\beta$) in different configurations: n=2 in panel (A) and n=8 in panel (B). Steps [1] and [2] represent polymerization and hydration, respectively. Scale bars: 1 cm.

As demonstrated herein, the addition of physical constraint members (i.e. threads/wires) results in reduced polymer growth in the region adjacent to and/or abutting (i.e. in direct contact with) said member, thereby allowing more rapid growth in other areas of the reaction vessel. Examples of the use of this technique to obtain leaf-like structures by the inclusion of from one to three wires as physical constraint members in a reaction vessel are provided below (e.g. see FIG. 4 and Example 2, and FIG. 11 and Example 6).

For the avoidance of doubt, it is noted that it is not essential for the entirety of the physical constrain member to be in contact with the hydrogel polymerisation solution. For example, in certain embodiments there may only be two or more (e.g. 2, 3, 4, 5, 6, 7, 8, 9 or 10, or more) point contacts between the physical constraint member and the hydrogel polymerisation solution, with the rest of the physical constraint member serving to connect the point contacts, but remain outside of the hydrogel polymerisation solution. In other words, such physical constraint members contain two or more stand portions and one or more connective portions, which act to cooperatively allow the physical constraint member to be placed in a standing position in the hydrogel polymerisation solution. Examples of this kind of physical constraint member (e.g. made of wires) are depicted and described in Example 4 and FIG. 7.

There is no particular limitation on the kinds of materials that can be used to form the physical constraint members mentioned herein, provided that they are relatively hydrophilic and so do not repel the hydrogel polymerisation solution, thereby preventing the content of the solution from interacting with the material. For example, when the physical constraint member is in the form of a thread, it may be made of cotton or other natural fibres or it may be made from a metal. When the physical constraint member is in the form of a wire, it may be made from any suitable metal, such as gold, silver, copper, iron and the like. When used herein, the term "thread" is intended to refer to a material that has similar properties to those used to manufacture clothing and, in certain embodiments, may be used to refer to a material that is relatively more flexible than the hydrogel that is formed around it. When used herein, a "wire" refers to a material that may display the properties of a normal metal wire and, in certain embodiments, may be used to refer to a material that is relatively less flexible than the hydrogel that is formed around it. As will be appreciated, the flexibility of the hydrogel can be varied by varying the composition of materials used in its manufacture, so it is possible that a single material may be considered to be thread-like or wire-like, depending on the hydrogel it is to be paired with.

In addition to the materials mentioned above, synthetic threads or wires may also be used. For example, the thread or wire may be made from any suitable elastomeric material that is suitably hydrophilic (e.g. by cutting or molding the elastomer into the desired shape).

It is to be noted that while the physical constraint member has to be a material that is hydrophilic in nature, so as to propose close association of the member and the hydrogel polymerisation solution, this does not mean that hydrophobic materials are excluded. That is, while hydrophobic materials in their natural state may be unsuitable for use in the invention, such materials may be subject to a treatment that makes then sufficiently hydrophilic for use in the process. For example, while PDMS may not be suited in its natural state, it can be treated with plasma to make it more hydrophilic and therefore suitable for use in the form of a wire/thread in the methods disclosed herein. The use of PDMS or other such material may be particularly useful where some walls of the reaction vessel are to be made of the same (or similar) hydrophobic material and it is intended that at least part of these walls will be treated with plasma as described above. In this situation, a PDMS wire/thread that projects from the reaction walls may be treated with plasma at the same time.

It is also noted that in certain embodiments there may be an added advantage in wrapping one or more hydrophilic threads (e.g. cotton threads) around a wire. This may make the wire more hydrophilic (potentially transforming a non-hydrophilic wire into a hydrophilic wire due to the combination) and/or may increase the degree of polymer growth inhibition. As such, these combinations are specifically contemplated in the current invention.

As will be appreciated, when metal is used in the physical constraint members, the resulting product may be suitable for use in flexible electronics and bioelectronics interface devices. For example in flexible electronic devices, the electronic circuits are typically mounted on a flexible plastic or an elastomeric substrate. Because the mechanical properties of hydrogels are closer to living tissue, they are promising materials as bioelectronic interfaces. Complex 3-dimensional geometries are often necessary when interacting with cells and tissues. It is believed that it is possible to incorporate electronic circuits into the hydrogel polymerisation solution and hence into the resulting hydrogel system. In this case, the electronic circuits can serve as the mechanical constraint, facilitating the formation of functional flexible electronics with desired 3D structures.

Finally, it is noted that the physical constraint members (e.g. threads and wires) may be subjected to chemical modification, in order to allow the formation of covalent bonds between the physical constraint member and the growing polymeric materials, thereby restricting polymeric growth. This will be described in more detail below with respect to the use of chemical constraint materials.

In addition to, or in place of, the use of physical constraint members, is also possible to introduce chemical constraint materials to the reaction vessel. When used herein, the term "chemical constraint material" is intended to refer to a substance that can completely inhibit the growth of polymer in the hydrogel polymerisation solution by forming a covalent bond with a growing polymeric material.

As indicated above, the chemical constraint materials can be applied to the surface of a physical constraint member (or to parts thereof) to further inhibit polymer chain growth in the vicinity of said member. In addition, the chemical constraint material may be used to treat one or more regions of the surface of the reaction vessel to achieve the same purpose. In the latter case, the use of such surface treatments may enable the design of particular shapes.

As will be appreciated, the chemical constraint material is a surface treatment, whereupon the surface of the reaction vessel has been modified to present a suitable functional group that is capable of forming a covalent bond with a growing polymeric chain. Examples of suitable functional groups that may be presented on treated regions of the reaction vessel surface include, but are not limited to, aldehydes, thiols and acrylate function groups (and combinations thereof).

Figure 8:
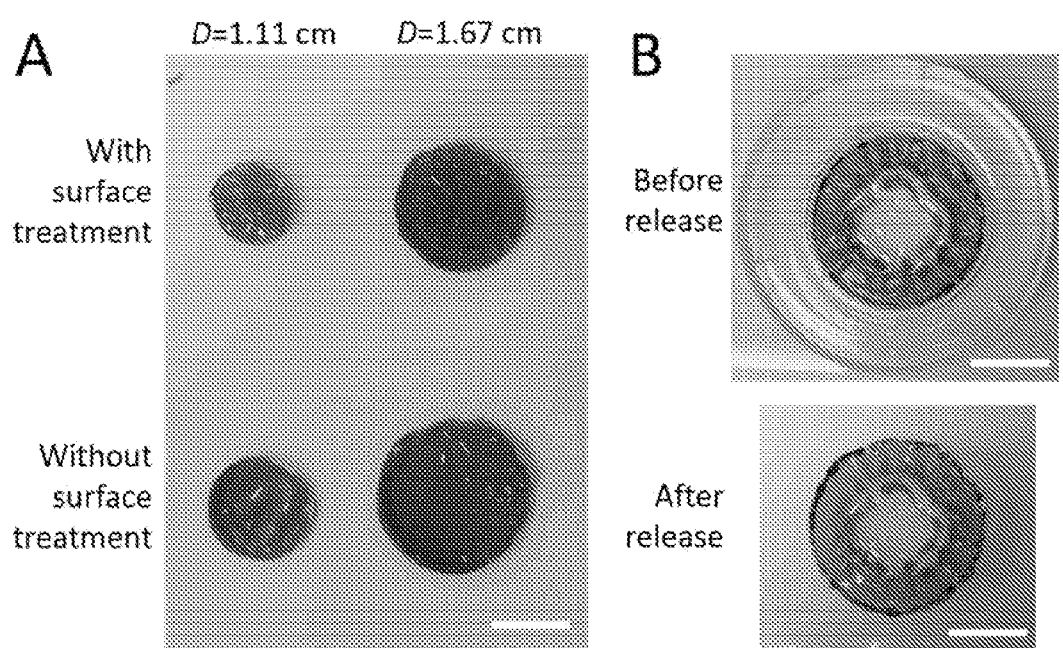
FIG. 8. Chemically bonding hydrogel onto glass surface suppresses internal growth. (A) Chemically activated substrate surface prevents the internal growth of hydrogel disks while hydrogel disks undergo internal growth on surface without chemical treatment. The sidewall of reaction chamber is hydrophobic and images were taken after removing the reaction chamber. (B) Chemically activated substrate surface prevents the internal growth of hydrogel ring. (Scale bars: 1 cm.)
Figure 9:
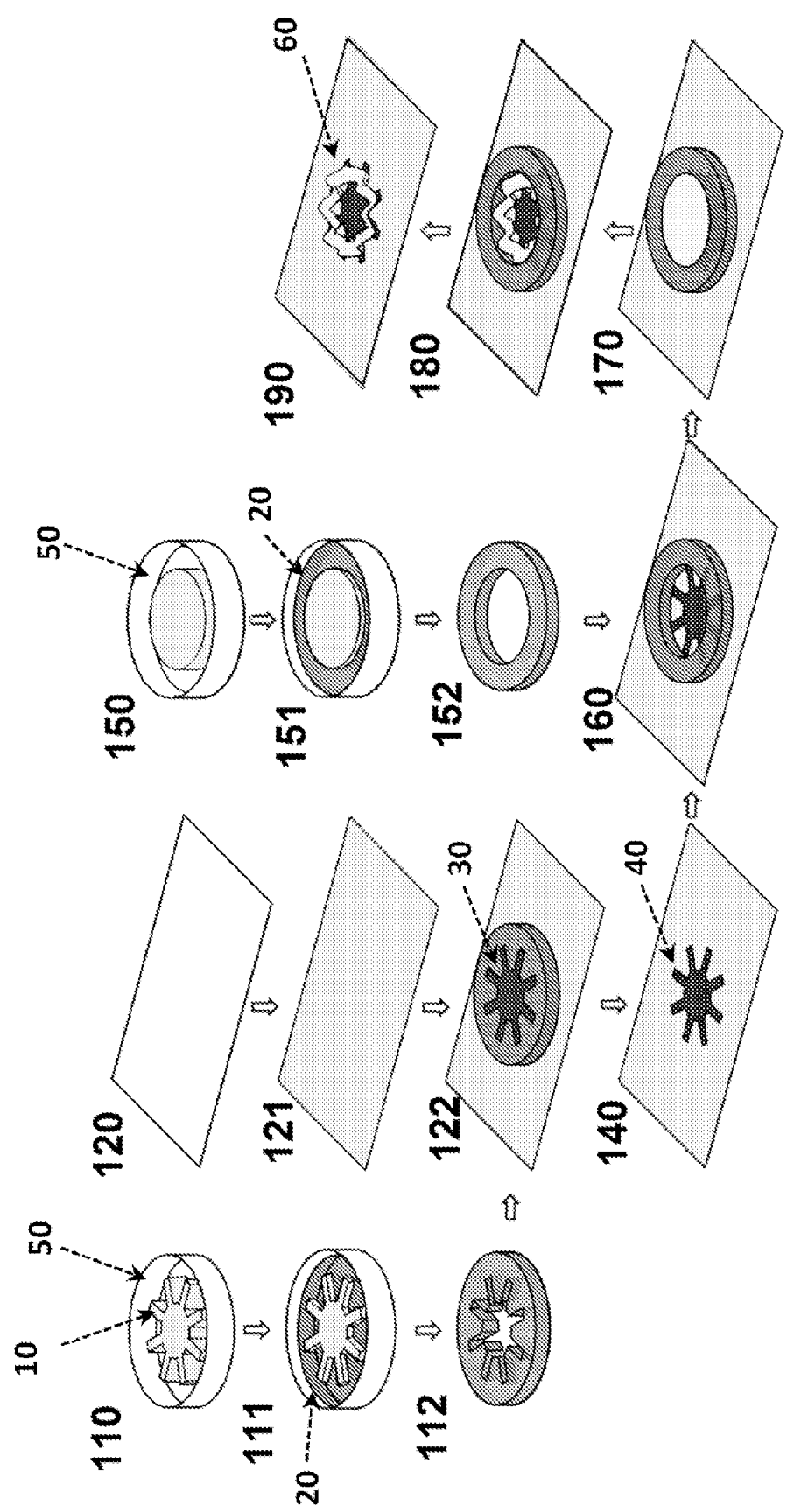
FIG. 9. Schematic illustration of experiments on soft 3D architecture generation with selectively activated glass substrates. The polymerization chamber is constructed by attaching a PDMS ring onto a selectively functionalized glass coverslip. The PDMS ring is created via replica molding of a laser-cut acrylic circle glued in a Petri dish. The coverslip is functionalized following successive incubations in APTMS and glutaraldehyde solutions. A PDMS mold with branch structures, obtained via replica molding of a laser-cut acrylic mold, is used to confine the surface that exposes to glutaraldehyde solution. After polymerization, detaching the PDMS ring renders a 3D hydrogel structure attached on the glass coverslip.
Figure 10:
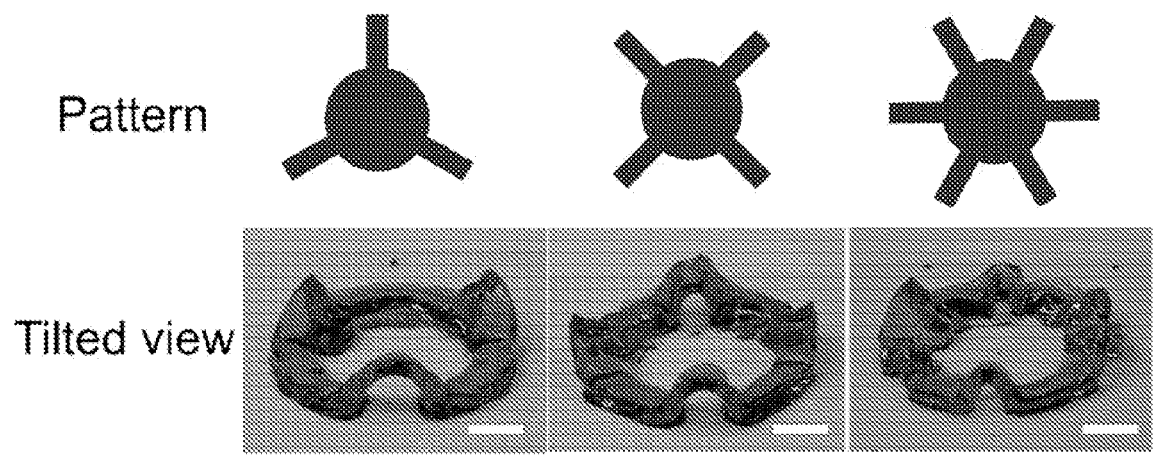
FIG. 10. Three-dimensional hydrogel architectures generated with selectively patterned glass substrates. The pattern regions denote the activated regions that can chemically bind with PA hydrogel. (Scale bars: 1 cm).

Example 5 and FIGS. 8-10 provide examples of how the surface of a reaction wall can be modified to include a chemical constrain member. In brief, a glass coverslip was immersed in a solution containing 3-aminopropyltriethoxysilane (APTMS), resulting in the displacement of one or more (i.e. all) of the ethoxy groups with a hydroxyl group on the glass surface to provide an amino-functionalised surface. This surface was then reacted with glutaraldehyde, to provide an aldehyde-functionalised surface that can react with a growing polymeric chain to form a covalent bond.

As will be appreciated, the materials obtained from the reactions described above are hydrogels. In many instances, the complex 3-dimensional structures obtained are formed as a result of the differential polymerization due to the presence of physical or chemical constraints. In certain of these structures, it is possible to obtain second-order structures by further hydrating the hydrogel, which hydration can further increase the mismatch extent between the constrained and free expanding regions generated in the hydrogel. This will be explained in more detail below.

Some embodiments of the present invention allow mimicking of natural shapes of plant leaves and flower petals. In the following, we investigate the origins of 3D shapes driven by biomechanical constraints and differential growth in plant organs and simulate these with finite element simulations. On this basis, we present here a scientific framework that establishes a morphological phase diagram which is capable of rationalizing four geometric configurations commonly found in plant organs: twisting, helical twisting, saddle bending, and edge waving. Our results show that the morphology of a growing leaf is determined by both the maximum value and the spatial distribution of growth strain. We further demonstrate the robustness of our scientific findings on differential growth-induced morphogenesis by synthetic reproduction of all four common geometric configurations in our phase diagram in a model hydrogel system that mimics plant growth through controlled manipulation of the polymerization process.

To investigate the effect of growth strain on morphogenesis, we conducted finite element (FEM) simulations of a long rectangular leaf with a non-uniform growth strain across its width direction.

Figure 12:
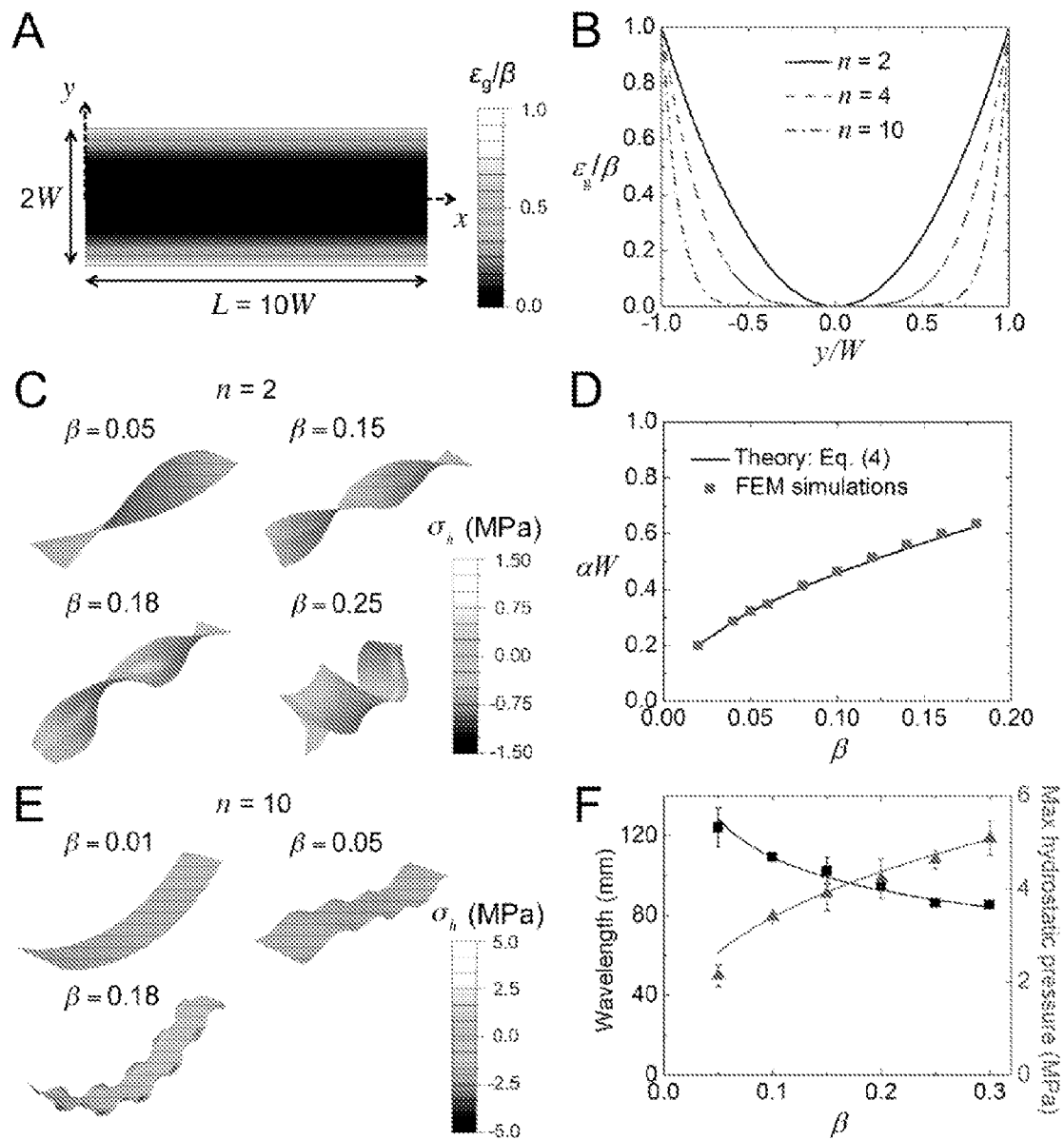
FIG. 12. Finite element modeling of a growing leaf. (A) Representative growth strain distribution normalized by maximum growth strain at the edge within a long leaf (strain increases from center to edge, but remains uniform along length direction). (B) Differential growth strain profiles with various n values normalized by the maximum growth strain. (C) Emergence of twisting and helical twisting configurations at n=2. Contours of hydrostatic stress at various maximum strain levels are plotted. (D) Normalized twist angle per unit length as a function of the maximum strain at n=2. The theoretical prediction is from Eq. (4), and the simulation results are from finite-element modeling. (E) Emergence of saddle bending and edge waving configurations at n=10. Color contours of hydrostatic stress at various maximum strain levels are plotted. (F) Wavelength of the edge waves (as represented by squares) and maximum hydrostatic stress level as a function of the maximum strain at n=10 (as represented by triangles).

FIG. 12A shows the leaf model used in the FEM simulations. The growth strain increases from zero at the centre to the maximum value at the edge. The growth strain profile along the width direction was approximated by a power-law function, as:

$$\varepsilon_g(y) = \beta\left(\frac{y}{W}\right)^n \quad (1)$$

where y and W are the distance from the strip to the center and half width of the leaf, respectively. The growth strain monotonically increases from zero at the center to a maximum value, $\beta$, at the edge when y=W. The power-law exponent, n, characterizes the steepness of the differential growth strain profile. As shown in FIG. 12B, increasing the value of n increases the steepness of the strain profile near the leaf margin and reduces the steepness of the strain profile in the interior region. In the present FEM simulations, we modelled the growth process as an equivalent thermal expansion problem. We allow the leaf to grow only along the x-axis direction by prescribing a uniform non-zero thermal expansion coefficient but a non-uniform temperature field, while expansion along the other directions is prevented.

Figure 15:
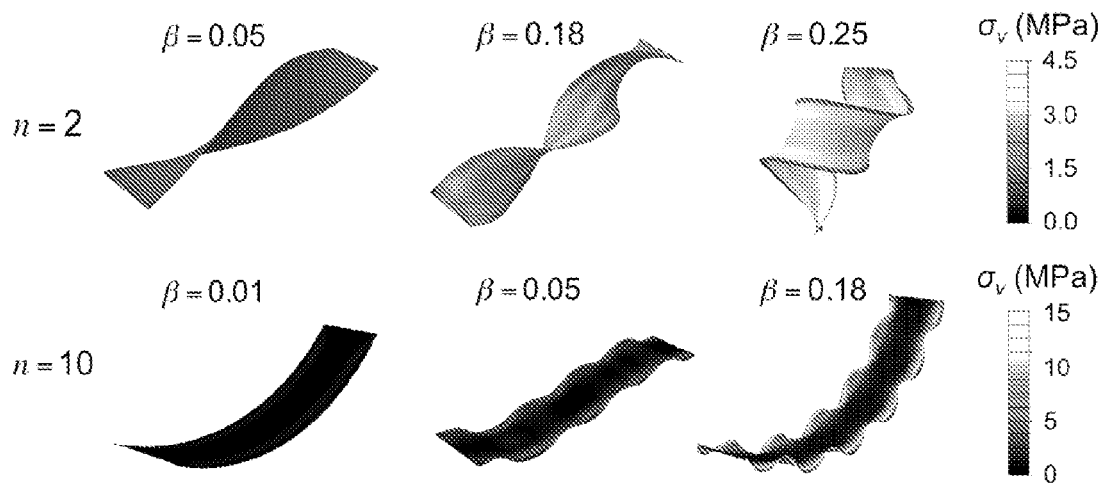
FIG. 15. Contour plots of von Mises equivalent stress at different maximum growth strain levels at n=2 and n=10.

In all simulations, deformation commences as planar at small growth strain; and instability then occurs at a critical level. For parabolic growth strain distribution with n=2, the first instability consistently leads to twisting (Configuration I) at a low growth strain level (FIG. 12C), representing the onset of initial instability from planar to 3D mode. As shown in FIG. 12C and FIG. 15, a twisted configuration at a low growth strain level is nearly stress-free. Solely from geometric considerations, we note that shape change of a leaf from stress-free planar into stress-free twisting configurations requires a growth strain profile given by $$\varepsilon_f(y)=\sqrt{1+(\alpha y)^2}-1, \quad (2)$$

where $\alpha$ is the twist angle per unit length along the stem. Taylor expansion of Eq. (2) gives $$\alpha = \frac{\sqrt{2\beta + \beta^2}}{W} \quad (4)$$

when the $4^{th}$-order term is one order of magnitude smaller than the $2^{nd}$-order term, the maximum strain at edge $\beta=\frac{1}{2}\alpha^2 W^2 \leq 0.2$. Equation (3) indicates that, at a low maximum strain level ($\beta \leq 0.2$), the formation of twisting configuration is energetically favorable for n=2. The twisting angle per unit length as a function of the maximum growth strain is derived from Eq. (2) as $$\varepsilon_g(y) = \frac{1}{2}(\alpha y)^2 - \frac{1}{8}(\alpha y)^4 + \frac{1}{16}(\alpha y)^8 + \ldots \approx \frac{1}{2}\alpha^2 W^2 \left(\frac{y}{W}\right)^2, \quad (3)$$

FIG. 12D shows that $\alpha$ increases monotonically with increasing strain. Results from the FEM 1.5 simulations are in good agreement with theoretical prediction. At a fixed maximum growth strain, wider leaves or petals twist less than narrower ones.

Figure 16:
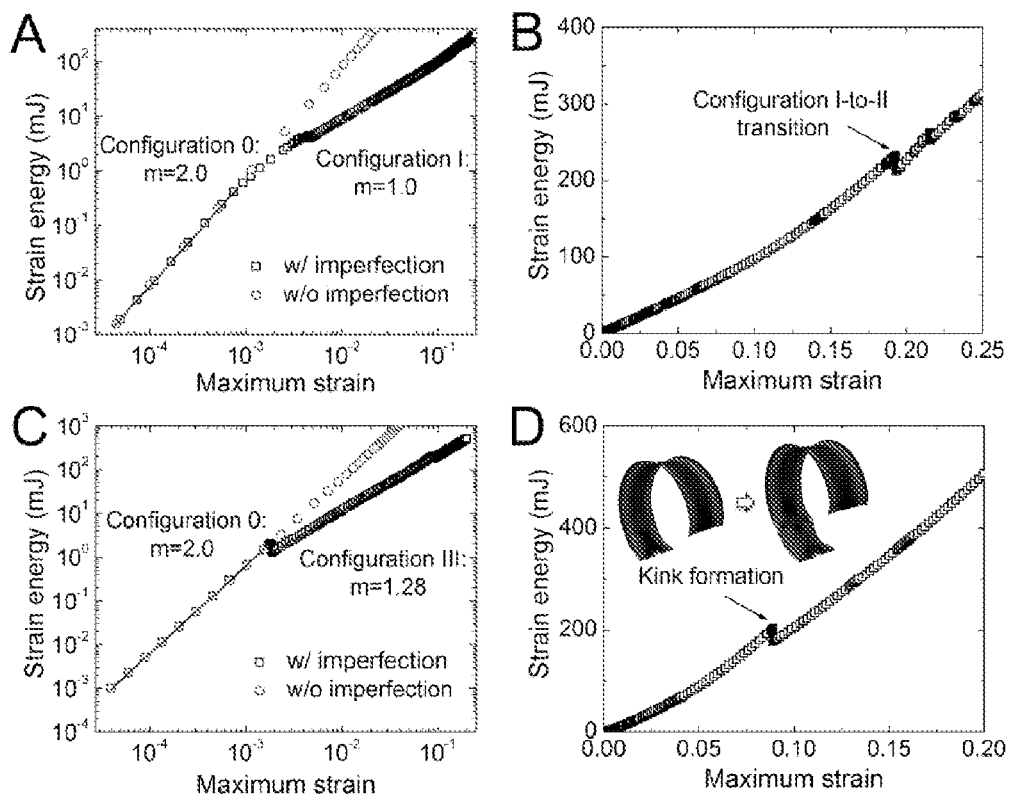
FIG. 16. Emergence of an intermediate state at n=4. (A) Contour plot of von Mises effective stress in a representative configuration of an intermediate state at $\beta=0.2$. (B) Strain energy evolution as a function of the maximum strain level. The kink represents a sudden strain energy drop as indicated by the black arrow.

FIG. 12C shows that, as growth strain increases, residual stresses due to in-plane stretch gradually build up as higher order terms in Eq. (3) become more important. Thus maintaining the twisting configuration becomes energetically more unfavorable. Consistent with the theory, our simulations reveal a transition from twisting to helical twisting (Configurations II) when the maximum growth strain approaches a critical level around $\beta=0.2$ This transition occurs with the deviation of center axis away from a straight line and a non-uniform distribution of the von Mises effective stress (FIG. 16).

For steeper change of growth strain, n=10 (see FIG. 12B), saddle bending configurations become energetically more favorable than twisting, as shown in FIG. 12E. This is mainly due to the fact that differential growth predominately concentrates in the marginal region of the leaf at higher n values. Consequently, twisting introduces significant in-plane stresses and high strain energy in the interior region. At low growth strains, the leaf grows into a saddle shape (Configuration III). Further increase in growth strain leads to the emergence of an undulating wavy pattern. Eventually, competition between bending in the marginal region and stretching in the interior results in edge waving (Configuration IV). Our simulation (FIG. 12F) shows that the wavelength of edge waves decreases with increasing maximum strain level and follows a power law relationship of $\lambda \sim \beta^{-0.2}$. The stress contours in FIG. 12E show that the highest hydrostatic stress levels occur at the peaks and valleys of the edge waves, and that hydrostatic pressure increases with an increase in maximum growth strain.

Figure 13:
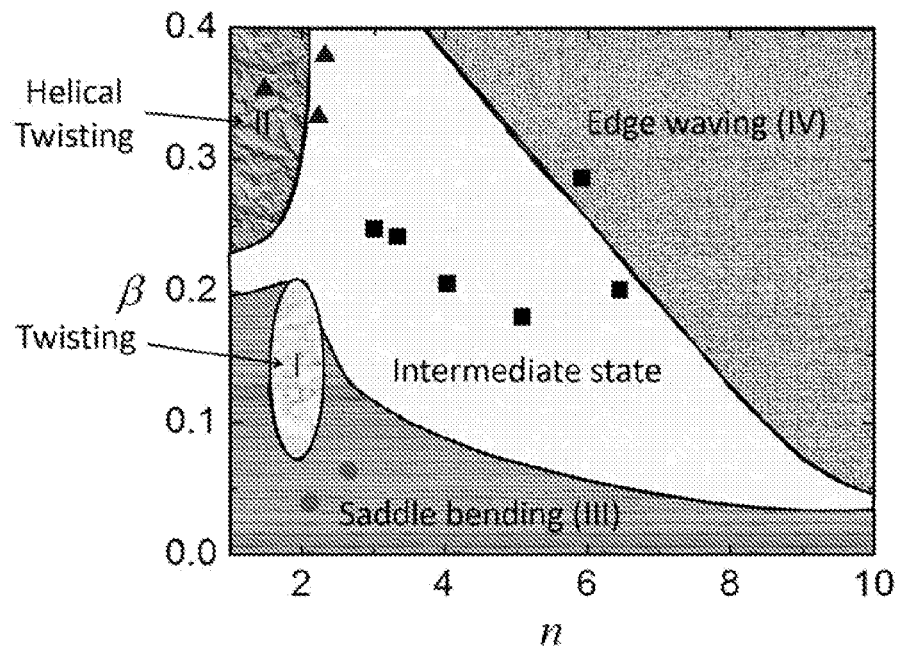
FIG. 13. Phase diagram of morphogenesis of thin plant organs as functions of n and/3. Data points are represented as triangles, squares and circles which denote leaves with twisting, edge waving and saddle bending configurations, respectively.

Through parametric simulations we developed a phase diagram of the morphogenesis of a growing leaf. FIG. 13 shows the parameter space (n, $\beta$) of different morphogenesis configurations (I, II, III, and IV). Experimental results measured from live leaves are superposed as data points on the phase diagram. Note that the boundaries between different zones are approximate. In particular, between the saddle bending (Configuration III) and edge waving (Configuration IV) regions, simulations show a wide transition zone with configurations of kinks along the length direction as demonstrated in FIG. 16B. The emergence of a kink from the saddle bending configuration is a result of a structural instability, accompanied by release of residual stresses in the central region, and by sudden strain energy drop as shown in FIG. 16B. At higher maximum strain $\beta$ and higher n values, however, this kink transition zone gives way to the edge waving zone.

Although the general trend of the simulation-generated phase diagram is consistent with the measurements from live leaves, there are some apparent discrepancies in the details. Our simulations predict that a twisting leaf transits into a helical twisting configuration when $\beta \approx 0.2$. However, measurements from twisting croton 'mammy' leaves show that this transition occurs at higher maximum growth strains (one leaf even has a maximum strain of $\beta \approx 0.7$,). This apparent discrepancy can readily be rationalized through considerations of a stiff mid-vein in croton 'mammy' leaves. As shown in FIG. 12C, change from twisting to helical twisting requires bending of the centerline, thus a higher driving force for a stiff mid-vein. Therefore, the twisting-to-helical twisting transition is expected to occur at a much larger maximum growth strain in the presence of a stiff mid-vein. Similarly, the presence of a stiff mid-vein in the fern tree leaves rationalizes why data points obtained from edge-waving leaves fall within the 'intermediate state' region.

Figure 14:
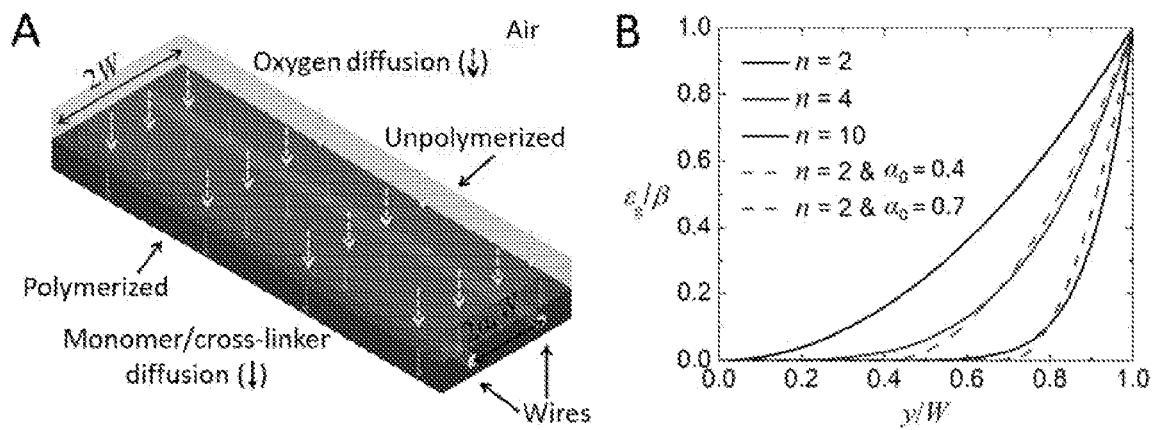
FIG. 14. In vitro reproduction of leaf morphogenesis. (A) Schematics of the working principles of the in vitro hydrogel system. (B) Manipulation of the growth strain profile in PA hydrogel.

With the foregoing quantitative knowledge of the role of mechanics in plant morphogenesis, we now explore synthetic reproduction of such processes and shapes in engineered systems. We resort to our development on the polyacrylamide (PA) hydrogel, in which we control the oxygen concentration to modulate the polymerization of PA hydrogel. As shown in FIG. 14A, oxygen diffusion from the surrounding air into the gel solution prevents gelation within the vicinity of liquid-air interface. Polymerization in the region away from the liquid-air interface consumes free monomers and cross-linkers, leading to a concentration gradient of free monomers and cross-linkers, and driving their diffusion from the non-gelation region into a polymerized hydrogel network. The continuous polymerization consequently leads to continuous growth of post-gelation region.

We induce differential growth of hydrogel by introducing geometric constraints. An example of such a constraint is a string (e.g. cotton thread) placed parallel to the centerline of the reaction chamber. The thread is relatively inextensible and imposes limited resistance to the out-of-plane bending deformation of the hydrogel sheet. Consequently, local growth of the hydrogel near the thread is inhibited as the edges grow, giving rise to a growth strain profile similar to that given by Eq. (1). The growth profile can be controlled by adjusting the location and stiffness of the constraining wire within the specimen. When we introduce a pair of cotton threads, separated by a distance of $2\alpha_0 W$, as demonstrated in FIG. 14A, the modified growth strain profile can be approximated as $$\varepsilon_g(y) = \beta \left| \frac{y - \alpha_0 W}{W - \alpha_0 W} \right|^n, \quad (5)$$

when $|y| \geq \alpha_0 W$. As shown in FIG. 14B, increasing the separation distance is essentially equivalent to increasing the value of n. It is difficult to quantify the exact value of the exponent experimentally. However, the configurations of the hydrogel in the presence of the thread suggests that the value is close to n=2 when a single string is placed along the centerline. FIG. 11A shows that the hydrogel naturally grows into a twisting configuration (I), and then turns into helical twisting (II) at higher strain level.

Other plant morphogenesis configurations can also be engineered by controlling the degree and location of the constraints. FIG. 11B shows that, when placing a pair of constraining threads with a separation distance of 0.68 W, the differential strain mismatch induced by polymerization transforms the hydrogel into a saddle bending shape (III). Further swelling the hydrogel leads to a configuration with wavy edges (IV).

The unique feature of the present technique is that the continuous polymerization process controlled by oxygen concentration, albeit chemically and mechanistically different, closely mimics the cell growth process in plants controlled by growth factor levels. Example 6 described below demonstrates that, with proper design of constraints, our technique is capable of mimicking morphogenesis of plant leaves and flowers.

Further aspects and embodiments of the invention are provided in the following non-limiting examples.

Preparation 1
Glass Surface Activation

To activate the glass surface, coverslips were plasma-treated for 1 min at a high power level (18 W) using a plasma cleaner (Harrick Plasma), followed by 30 min incubation in 4% 3-aminopropyltrimethoxysilane (APTMS; Sigma-Aldrich) in isopropanol, and then 30 min incubation in 1% glutaraldehyde solution (Alfa Aesar). Polydimethylsiloxane (PDMS) molds with various numbers of branch structures were used to confine the glass surface that is exposed to the glutaraldehyde solution, yielding selectively functionalized patterns.

Preparation 2
Reaction Chamber Construction

In reactions discussed herein, the reaction chamber can be an assembly of a PDMS ring on a glass coverslip, or may be a different shape based on the same techniques. Therefore, while the below relates to the formation of a reaction chamber in the form of a cylinder, it will be appreciated that other shapes and sizes of reaction chamber may be formed using similar techniques.

To prepare a mold for making a PDMS ring, a desired pattern was cut out of a 6.35-mm-thick acrylic sheet using a laser cutter (Epilog Laser) and then glued onto the bottom surface of a Petri dish using a two-part epoxy (Gorilla Epoxy; Gorilla Glue Inc.). PDMS rings were prepared by pouring a 10:1 weight mixture of base to curing agent (Sylgard 184; Dow Corning) into the mold. After curing at 65° C. for 2 h, the resulting crosslinked PDMS ring was carefully removed from the mold and assembled onto a glass coverslip with gentle pressure. The glass coverslip may have an unactivated surface or may have an activated surface, prepared as described in preparation 1.

When used (as explicitly indicated in the examples below), plasma treatment was performed for 1 min at a high power level (18 W) using a plasma cleaner (Harrick Plasma), and the same setting was used for all plasma treatments performed herein.

The reaction chamber can be treated with plasma. Plasma treatment is needed only for the following purposes in the examples below:
1. To manipulate the surface hydrophobicity. Plasma treatment will make the wall more hydrophilic.
2. To chemically activate the bottom surface (i.e. the glass coverslip) in the examples. Plasma treatment is performed before incubating in 4% APTMS in isopropanol.

As indicated in the description, other uses for plasma treatment are envisaged.

Measurement 1
Contact Angle Measurement

The contact angle between gel solution and PDMS surface was measured using a ramé-hart Contact Angle Goniometer (ramé-hart instrument co.). The gel solution was a mixture of 10% acrylamide and 0.1% bis-acrylamide (AM-RESCO) in deionized water (the stated percentage refers to weight percent and is calculated based on the total gel solution as a whole). To prepare the PDMS substrates, a 10:1 weight mixture of base to curing agent (Sylgard 184; Dow Corning) was thoroughly mixed, degassed, and cured at 65° C. for 2 h. During the measurement, small droplets of gel solution were placed onto flat PDMS substrates using a micropipette, while the built-in camera system simultaneously records the droplet profile from which the instant contact angle was automatically calculated in the DROPimage software (ramé-hart instrument co.). The volume of the gel solution droplet was gradually increased from 1 μL until the contact angle started to decrease. The maximum equilibrium contact angle was used as the default contact angle between the gel solution and the PDMS substrate. Measurements were performed on both PDMS substrates with and without plasma treatment.

The resulting wetting angles are depicted in FIG. 1. When a hydrophobic surface for the PDMS reaction chamber is used (i.e. untreated PDMS), the wetting angle is $\theta=107.5\pm1.7°$. Plasma treatment switches the PDMS surface from hydrophobic to hydrophilic and consequently changes the meniscus shape from convex to concave, thereby providing a wetting angle of $\theta=14.3\pm1.0°$.

Calculation 1
Meniscus Shape and $O_2$ Distribution Prediction

For a given volume of gel solution, we numerically predict the surface profile inside a cylindrical chamber using the open-source SE-FIT software. The prebuilt Z-cylindrical container is used with the contact angle measured experimentally. The equilibrium surface profiles obtained with a surface tension $\gamma=0.072$ N/m and gravity acceleration $g=9.8$ m/s$^2$ were exported from SE-FIT and reconstructed in the commercial software ABAQUS (Dassault Systèmes (2014) ABAQUS Documentation (Dassault Systèmes, Providence, R.I.), Version 6.14) to simulate the dynamics of oxygen diffusion. We modelled the $O_2$ diffusion as an equivalent axisymmetric thermal conduction problem. The diffusivity of oxygen inside the gel solution ($D=8\times10^{-6}$ cm$^2$/s) (Hepworth S J, et al., (1999) *Phys. Med. Biol.* 44:1875-1884) was converted to an equivalent thermal diffusivity. Oxygen diffusion from the PDMS side was negligible for the following reasons and therefore not considered in our simulations. First, the diffusivity of $O_2$ in PDMS is comparable to that in gel solution (Markov D A, et al., (2014) *Biomed. Microdevices* 16:91-96.), but the thickness of the PDMS wall is one order of magnitude larger than the height of the gel solution. In addition, plasma treatment generates a silica layer on the PDMS surface which further limits the diffusion of $O_2$ significantly. The four-node axisymmetric convection/diffusion quadrilateral element was used for the simulation.

General Procedure 1
Polymerization of PA Hydrogel

Before polymerization, the gel solution (comprising 10% acrylamide and 0.1% bis-acrylamide in deionized water. The percentage refers to weight percent and is calculated based on the gel solution as a whole) was degassed for at least 30 min in a vacuum desiccator to completely remove dissolved oxygen. Polymerization was then initiated by introducing tetramethylethylenediamine (TEMED; Teknova) and ammonium persulfate (APS; Promega) into the gel solution with final concentrations of 0.3% and 0.05%, respectively (for TEMED, the percentage is volume percent; for APS, the percentage is weight-to-volume percent. Both are based on the gel solution before these components were added). The gel solution of a desired volume was immediately pipetted into the desired polymerization chamber with minimal disturbance so as to avoid introducing oxygen. The solution was then allowed to react for 3 h (no further growth is expected after 3 h because polymerization usually finishes within 1-2 hours) before replacing the unpolymerized solution with food-dye solution to stain the polymerized hydrogel for imaging purpose. The reaction chamber is disassembled after the completion of polymerization to release hydrogel structures. This disassembly step is only applicable to the scenario in which a reaction chamber is constructed by assembling a PDMS structure on top of a glass coverslip.

In all experiments conducted herein, we intentionally allow the gel solution to polymerize under open-air conditions, instead of preventing the gel solution from being exposed to $O_2$. Under this condition, polymerization is a dynamic reaction-diffusion process as illustrated in FIG. 2A. The ambient air maintains a constant $O_2$ concentration ($c_0$=20.9% vol/vol) at the liquid-air interface. As dissolved $O_2$ is completely removed before introducing the catalysts and initiators, the concentration gradient drives $O_2$ to continuously diffuse from the liquid-air interface into gel solution once the polymerization is initiated. This process leads to the termination of polymer chain growth by accumulated $O_2$ near the liquid-air interface. Visible gelation is then possible only in the region away from the interface.

The reaction scheme is summarized in Table 1. The copolymerization of the monomers, acrylamide, with the cross-linkers, bis-acrylamide, is initiated by adding the initiator APS and the catalyst TEMED into gel solution. TEMED accelerates the formation rate of primary free radicals from APS. The free radicals (i.e., sulfate and hydroxyl radicals generated by APS in the presence of TEMED convert acrylamide monomers into new free radicals that further react with inactivated monomers, effectively propagating the polymer chain. While normal chain termination happens when two radical species react with each other forming a longer chain, radicals can also be consumed by dissolved oxygen which converts a strong radical to a much less reactive peroxyl radical. The peroxyl radical is not reactive enough to continue polymer chain growth.

TABLE 1

Reaction scheme of PA hydrogel

| Description | Reaction | Note |
|---|---|---|
| Primary free-radical generation | $S_2O_8^{2-} \rightarrow 2\ SO_4\text{-}^*$<br>$SO_4\text{-}^* + H_2O \rightarrow HSO_4\text{-} + {}^*OH$ | Both $SO_4\text{-}^*$ and $^*OH$ can initiate PA polymerization. |
| Chain initiation | $I^* + M \rightarrow IM^*$ | $I^*$: $SO_4\text{-}^*$ or $^*OH$<br>M: monomer/cross-linker<br>$IM^*$: activated monomer |
| Chain propagation | $IM_n^* + M \rightarrow IM_{n+1}^*$ | $IM_n^*$ activated polymer chain with n monomers |
| Chain termination | $IM_m^* + IM_n^* \rightarrow IM_{m+n}I$ | |
| Oxygen inhibition | $IM_n^* + O_2 \rightarrow IM_nOO^*$ | The peroxyl radical is not energetically favourable for initiating polymerization |

EXAMPLES

Example 1

The surface hydrophobicity of cylindrical polydimethylsiloxane (PDMS) reaction chambers was modified by plasma treatment to demonstrate how $O_2$ concentration can be strategically controlled to produce a desired shape in a forming hydrogel.

The meniscus profile of a gel solution inside a reaction chamber can be predicted with the open source Surface Evolver-Fluid Interface Tool (SE-FIT) (Chen Y, et al., (2011)|*Proceedings 49th AIAA Aerospace Sciences Meeting Including the New Horizons Forum and Aerospace Exposition* (American Institute of Aeronautics and Astronautics, Orlando, Fla.), 2011-1319) and used to estimate the distribution of $O_2$ during polymerization (see calculation 1 above).

Figure 2:
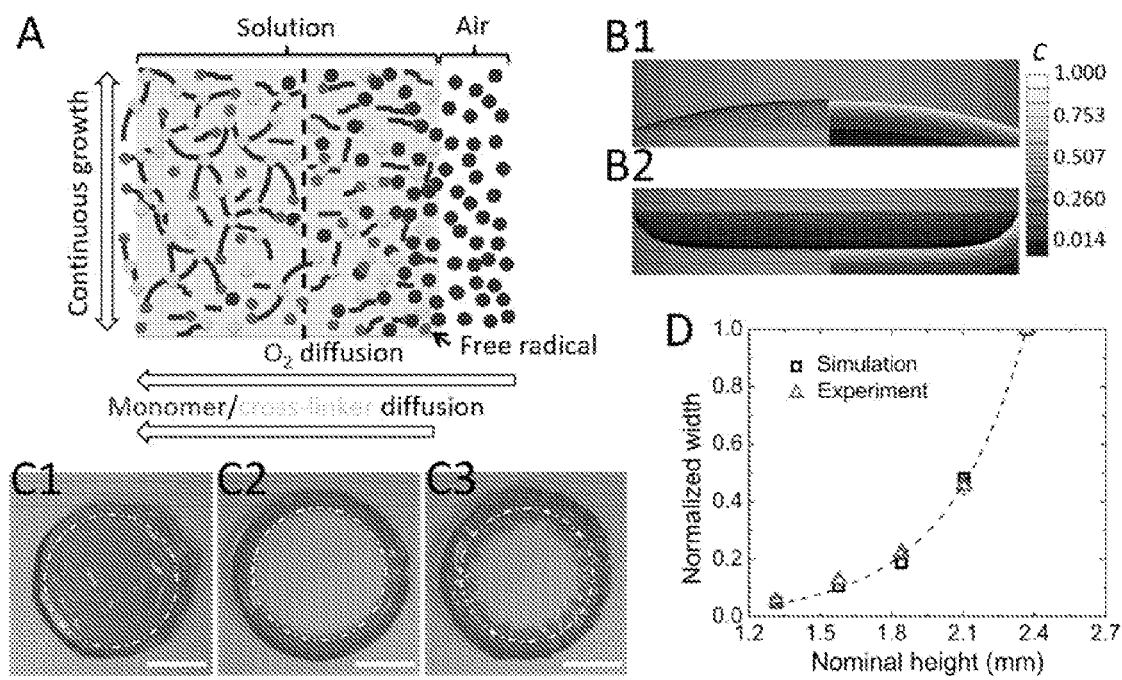
FIG. 2 Disk-to-ring transition of PA hydrogel via controlled oxygen diffusion with the modification of surface hydrophobicity. (A) Schematic representation of the polymerization process. Gelation occurs because of diffusion-mediated oxygen inhibition only on the left side of the black dashed line. (B) Simulated menisci of the gel solution inside a cylindrical PDMS chamber without (B1) and with (B2) plasma treatment, respectively, overlaid with contour plots of the oxygen concentration inside the gel solution after 265 s. Bulk liquid exists below the meniscus. Oxygen concentration is normalized by the concentration at the liquid-air interface. Gelation regions (black or darkest regions in image) are identified as the region where normalized oxygen concentration is below 1.4% (e.g. see Hepworth S J, et al., (1999) *Phys. Med. Biol.* 44:1875-1884). (C) Dimensions of polymerized hydrogel without (C1) and with (C2 and C3) plasma treatment after taking the specimen out of the reaction chamber. The initial nominal liquid heights, the volume of the gel solution normalized by the bottom area of the chamber, are 1.84 mm for C1 and C2 and 2.10 mm for C3. White dashed circles indicate the size of the reaction chamber. (Scale bars: 1 cm.) (D) Experimental and simulation results of the normalized ring width, i.e., the width of the ring structure normalized by the radius of the chamber, as a function of the nominal height of the gel solution.

Each of the reaction chambers used for the manufacture of the discs C1-C3 (as shown in FIG. 2) were constructed by assembling a PDMS ring on top of a piece of glass coverslip. The PDMS ring was prepared by replica molding in an acrylic mold which was prepared by laser cutting a circular pattern (diameter of 22.2 nm) out of a 6.35-mm-thick acrylic sheet and gluing onto the bottom surface of a Petri dish using a two-part epoxy, following the process described in detail in preparation 2. Prior to introducing gel solution into the reaction chambers, the reaction chambers used to manufacture disc C2-C3 were plasma treated for 1 min using the settings detailed in preparation 2. Polymerization was then initiated by following the steps in General Procedure 1. The volumes of gel solution pipetted into reaction chambers for the manufacture of discs C1-C2 and C3 were 700 μL and 800 μL, respectively.

Figure 3:
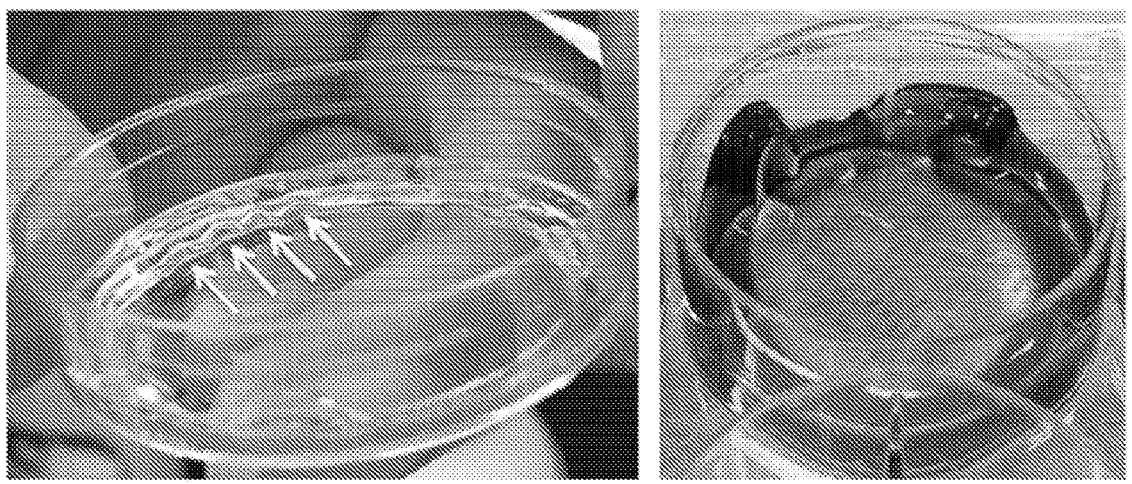
FIG. 3. Emergence of structural instabilities during polymerization. The continuous internal growth of hydrogel ring leads to undulating wrinkles (arrows in the photo on the left) at an early stage of polymerization and buckling instability (photo on the right) at the late stage.

As shown in FIG. 2B, a hydrophobic surface for the PDMS reaction chamber (wetting angle θ=107.5±1.7°, FIG. 1) gives rise to $O_2$ depletion at the centre of the bottom of the chamber, leading to the formation of a disk-shaped hydrogel (FIG. 2C1). Plasma treatment switches the PDMS surface from hydrophobic to hydrophilic (θ=14.3±1.0°, FIG. 1) and consequently changes the meniscus shape from convex to concave. Although the reaction chamber has a base made from glass, it is the interface between gel solution and PDMS wall that determines the meniscus profile. The glass base is always fully covered by the gel solution. A hydrophilic PDMS surface gives rise to $O_2$ depletion at the corner of the chamber, forming a ring-shaped hydrogel (FIGS. 2C2 and 2C3). Simple diffusion simulations of $O_2$ concentration (FIG. 28) allow us to predict the disk-to-ring transition (FIG. 2C), and predict the increase of the ring-wall width with increasing initial volume of gel solution. The predicted ring-wall width agrees well with experimental results (FIG. 2D).

We also note that the polymerization of PA hydrogel proceeds in a unique growth mode benefiting from its porous structure. As shown in FIG. 2A, the copolymerization of monomers and cross-linkers in the gelation region (on the left of the dashed line) results in a concentration gradient of the free monomers and cross-linkers, from high concentration near the liquid-air interface to low concentration inside the cross-linked hydrogel. Benefiting from its porous nature, free monomers and cross-linkers are able to diffuse into the cross-linked hydrogel network from the liquid gel solution region. Meanwhile, as pointed out earlier, $O_2$ concentration is also low inside the hydrogel, thus facilitating continued polymerization in postgelation region. This unique growth mode is evidenced by the emergence of buckling of the hydrogel ring as its continued growth is confined by the reaction chamber (FIG. 3). FIG. 2C shows that upon taking the polymerized hydrogel out of the reaction chamber, the radius of the hydrogel disk and that of the hydrogel ring are bigger than the reaction chamber dimension (the reaction chamber dimension is depicted by the white dashed-line circles). It is worth noting that this internal growth mode of hydrogel is fundamentally different from that of crystal growth during which new constituent atoms, molecules, or ions are added to the outer surface of an ordered crystal lattice. In fact, this growth mode is more similar to living tissue growth through cell enlargement and division. During living tissue growth, the growth factors dictate the synthesis of new biomass from available nutrients, whereas during hydrogel growth the $O_2$ concentration regulates the rate of gelation. The diffusion of monomers and cross-linkers, on the other hand, resembles the transport of nutrients.

Example 2

Biomimetics of Tissue Morphogenesis

Figure 4:
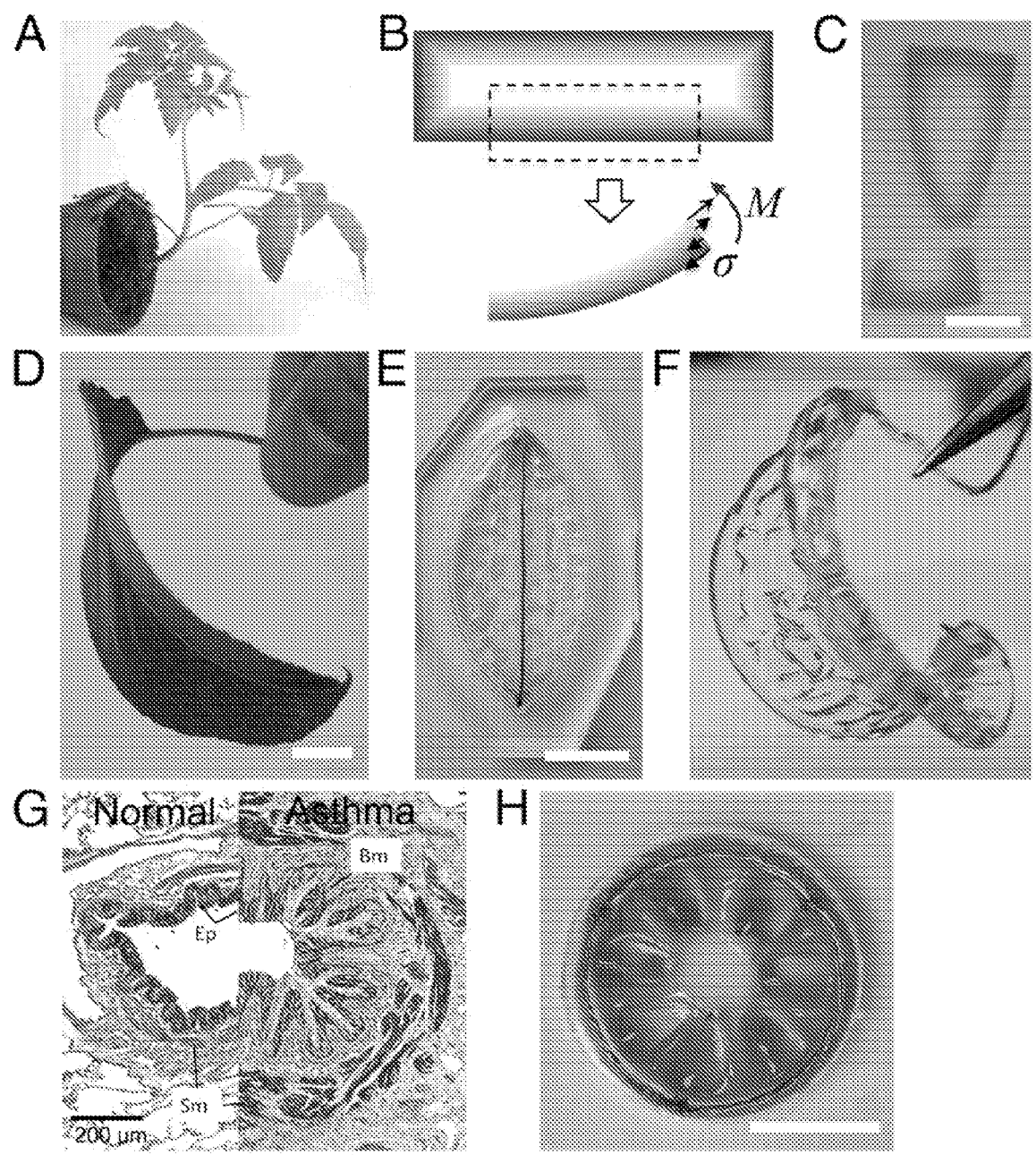
FIG. 4. Biomimetics of the morphogenesis of plant and animal tissues. (A) Directional bending of plant stem in gravitropism (image from internet). Schematic (B) and experimental (C) demonstrations of directional bending of a rectangular hydrogel ring through oxygen diffusion-mediated differential polymerization. (D) Representative image of saddle-shaped leaf. (E and F) Polymerized PA gel in an elliptical chamber with geometric constraint imposed by a soft wire before (E) and after (F) being taken out of the chamber. (G) Movat's pentachrome stain of human normal and asthmatic airways. (H) Polymerized hydrogel with circular line constraint. (Scale bars: 1 cm).

We further demonstrate the similarities between our method for continuous polymerization of hydrogel and several biological processes by successfully reproducing the complex shapes found during tissue morphogenesis in both plants and animals (FIG. 4).

Preparation Protocols

For FIG. 4C:

A rectangular pattern (length: 34.09 mm; width: 11.35 mm) was cut out of a 6.35-mm-thick acrylic sheet and glued onto the bottom of a petri dish. PDMS structure with a rectangular hole was prepared by replica molding the acrylic mold and the reaction chamber was prepared by assembling the PDMS structure on top of a glass coverslip (see preparation 2). Following the additional procedures described in the preparation 2, plasma treatment was performed to change the PDMS wall from hydrophobic to hydrophilic. As described in General Procedure 1, TEMED and APS were mixed with degassed gel solution to initiate polymerization. The gel solution of 700 µL was immediately introduced into the reaction chamber and allowed to react for up to 3 hr. A rectangular hydrogel ring was formed at the end of the experiment. Cutting the long side apart would lead to inward bending of the hydrogel.

For FIGS. 4E and F:

An oval pattern (major axis: 33.32 mm; minor axis: 16.66 mm) was cut out of a 6.35-mm-thick acrylic sheet and glued onto the bottom of a petri dish. PDMS structure with an oval hole was prepared by replica molding the acrylic mold and the reaction chamber was prepared by assembling the PDMS structure on top of a glass coverslip (following the process described in preparation 2 above). As described in General Procedure 1, TEMED and APS were mixed with degassed gel solution to initiate polymerization. The gel solution of 700 µL was immediately introduced into the reaction chamber and a cotton thread was forced to be immersed under the gel solution by fastening to the two stands of a folded metal wire (the metal wire was not in touch with the solution except its stands). Polymerization was allowed to happen for up to 3 hr. A leaf-shaped hydrogel structure was formed after taking the hydrogel out the reaction chamber and cutting apart the metal wire.

For FIG. 4H:

A circular pattern (diameter: 22.2 mm) was cut out of a 6.35-mm-thick acrylic sheet and glued onto the bottom of a petri dish. PDMS structure with a circular hole was prepared by replica molding the acrylic mold and the reaction chamber was prepared by assembling the PDMS structure on top of a glass coverslip (following the process described in preparation 2 above). Following the additional procedure described in preparation 2, plasma treatment was performed to change the PDMS wall from hydrophobic to hydrophilic. As described in General Procedure 1, TEMED and APS were mixed with degassed gel solution to initiate polymerization. The gel solution of 800 µL was immediately introduced into the reaction chamber and a circular metal wire was placed underneath the gel solution. An undulating wavy hydrogel pattern was formed at the end of the polymerization.

Figure 5:
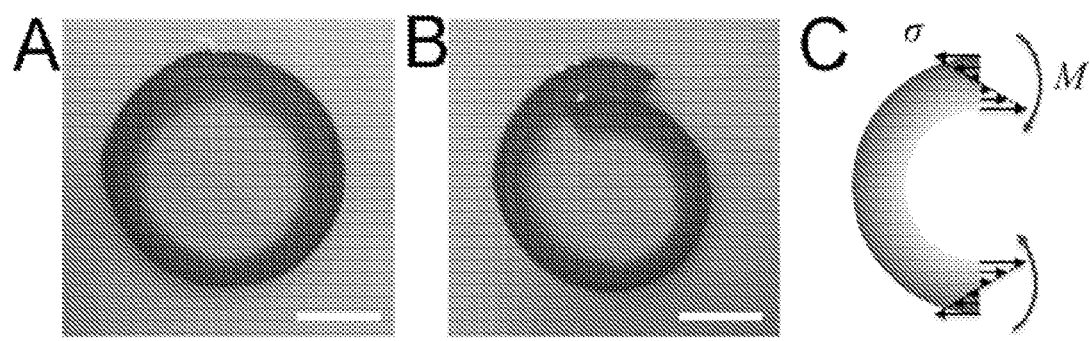
FIG. 5. Differential polymerization-induced residual bending moment in a hydrogel ring. (A) Photograph of a PA hydrogel ring after being taken out of the reaction chamber. (B) Inward bending of the hydrogel ring after it is cut open. (C) Schematic demonstration of the existence of a residual bending moment due to differential polymerization. Oxygen concentration is expected to gradually decrease from the inner side of the ring to the outer side, and therefore polymerization rate increases from the inner side to the outer side. The differential growth rate is expected to result in compressive stress in the outer side while tensile stress results in the inner side. (Scale bars: 1 cm).

FIG. 5 was produced in a similar way as FIG. 4C. The only difference is the shape of the reaction chamber. A circular reaction chamber (diameter: 22.2 mm) was used to manufacture the hydrogel in FIG. 5.

Discussion i) The directional bending of plant stems responding to change of direction of gravity or sunlight is a good example of how the local chemistry (in this case, auxin) regulates tissue morphogenesis. In gravitropism, the sedimentation of statoliths, dense organelle in cells in the endodermic layer of the stem, activates the mechanosensitive signaling pathways which transport auxins to the lower part of the stem. Enhanced auxin concentration locally promotes stem growth.

The differential growth between upper and lower parts of the stem therefore leads to upward bending of the stem (FIG. 4A). In our experiments of hydrogel polymerization, $O_2$ regulates the reaction rate, leading to the differential growth-induced directional bending of the hydrogel structure. As shown in cartoon form by FIG. 4B, a rectangular hydrogel ring formed in a rectangular chamber is regulated by an $O_2$ concentration gradient, from high concentration near the inner side (exposed to ambient air) to low concentration near the outer side (near the chamber wall). The polymerization rate therefore is higher near the outer side, resulting in a residual compressive strain on the outer side while a tensile strain develops on the inner side (FIG. 4B).

This hypothesis was validated by our experimental results (FIG. 4C), when the mechanical constraint was relieved by slicing the hydrogel open, directional bending toward the inner side occurs. A similar observation with a circular hydrogel ring is shown in FIG. 5.

ii) Material heterogeneity within a single tissue serves as a catalyst for creating differential growth in living tissues. During such differential growth, the region that grows relatively more slowly imposes a mechanical constraint on the region where growth occurs faster. For example, the growth rate difference in a leaf between the slow-growing mid-vein and the fast-growing edge leads to the emergence of a saddle-shaped configuration, as shown in FIG. 4D.

To mimic this phenomenon, we introduced a soft cotton wire along the long axis of an elliptical chamber (FIG. 4E). The geometric constraint imposed by the soft wire effectively suppressed the local hydrogel growth near the wire, whereas regions away from the wire underwent continuous internal growth. As shown in FIG. 4F, a saddle-shaped configuration was formed after the hydrogel was taken out of the reaction chamber.

iii) Another example is the morphogenesis of human respiratory airways in asthma patients. Compared with normal airways, the airways in asthma patients undergo significant architectural remodelling, including swollen airway lining and tightened smooth-muscle constraint. As shown in FIG. 4G, the smooth muscles in the outermost layer of the airway impose a stiff geometric constraint to the swelling of the soft airway lining, causing constriction and an undulating pattern of the airway canal. In our hydrogel experiment, we generated a buckled, wavy pattern on the inner wall by using a stiff circular line constraint, similar to that of the stiff smooth-muscle layer in asthma patients (FIG. 4H).

Example 3

Three-Dimensional Architecture Generation (1)

The current method offers a means to generate complex soft 3D architectures in hydrogels.

Figure 6:
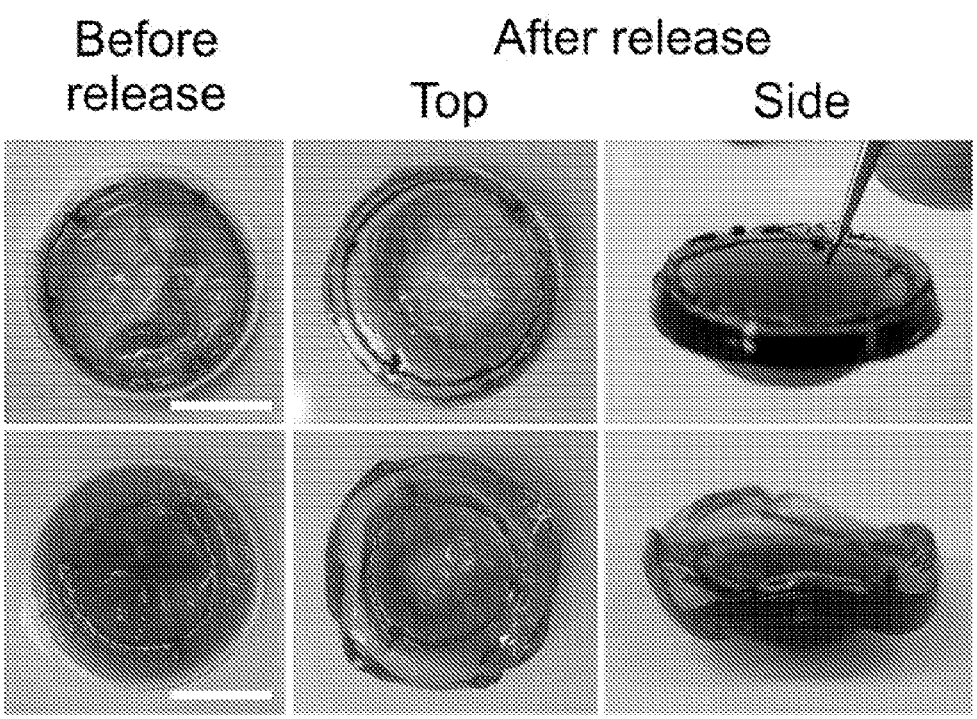
FIG. 6. Self-assembled 3D soft hydrogel bowls with and without a wavy edge. Blue food-dye solution is held in the bowls to demonstrate their structural integrity. (Scale bars: 1 cm).

The protocol for generating the shapes in FIG. 6 is as follows. To prepare the molds for making PDMS rings, circular patterns with a diameter of 22.2 mm were cut out of a 6.35 mm thick acrylic sheet using a laser cutter (Epilog Laser) and then glued onto the bottom surface of a Petri dish using a two-part epoxy (Gorilla Epoxy; Gorilla Glue Inc.) and PDMS was then cured in the mold to form a PDMS ring. The PDMS rings were then used to construct two reaction chambers, which comprise of a PDMS ring assembled on top of a glass coverslip. As described in General Procedure 1, TEMED and APS were mixed with degassed gel solution to initiate polymerization. The gel solution of 800 μL was immediately introduced into each of the two reaction chambers and circular metal wires of different diameters (~19 mm and 13 mm for bowls without and with wavy edges, respectively) were placed underneath the gel solution. Polymerization was allowed to happen for up to 3 hr.

FIG. 6 shows that by controlling polymerization and mechanical constraints, the hydrogel self-assembles into 3D bowls with and without ruffled edges. Differential growth is introduced by submerging a stiff circular wire in gel solution. While the presence of the wire suppresses local growth of the hydrogel, hydrogel continues to grow at the inner part of the disk and at the outer edge. Depending on the location of the constraining wire, which generated residual strain due to differential growth, a bowl-shaped structure with either a flat edge (FIG. 6, top row), or a buckled, wavy edge (FIG. 6, bottom row) can be obtained following release of the hydrogel from the reaction chamber.

Example 4

Three-Dimensional Architecture Generation (2)

Figure 7:
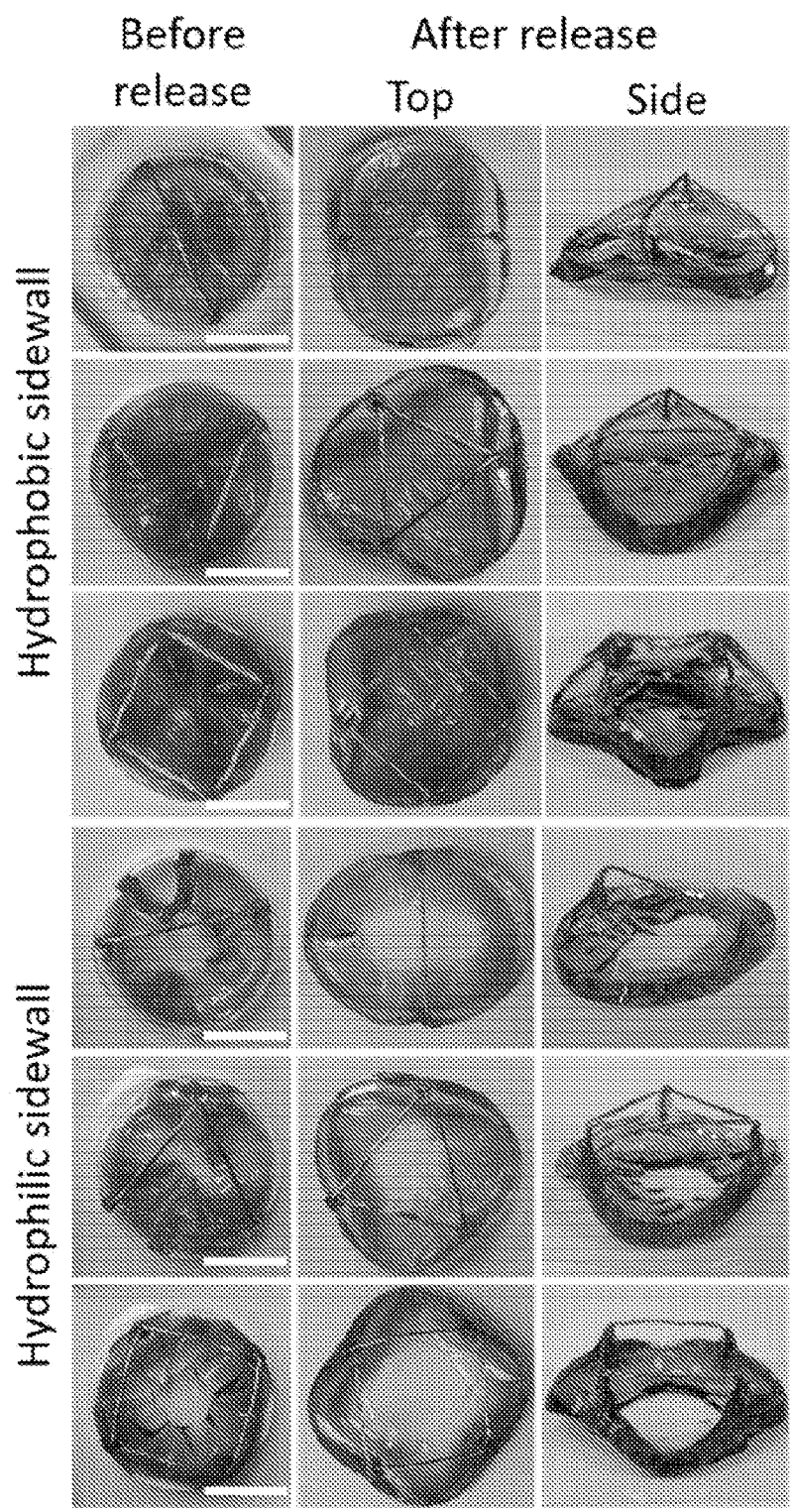
FIG. 7. Self-assembled 3D architectures in reaction chambers with different sidewall hydrophobicity. Mechanical constraints are introduced with stiff metal wires. (Scale bars: 1 cm).

This example relates to the physically constrained products shown in FIG. 7.

The protocol for generating the shapes in FIG. 7 was as follows. To prepare the molds for making a PDMS ring, a circular pattern with a diameter of 22.2 mm were cut out of a 6.35 mm thick acrylic sheet using a laser cutter (Epilog Laser) and then glued onto the bottom surface of a Petri dish using a two-part epoxy (Gorilla Epoxy; Gorilla Glue Inc.) and PDMS was then cured in the mold as described in preparation 2. The PDMS ring was then assembled on top of a glass coverslip to construct a reaction chamber. Six reaction chambers were produced this way.

Three of these reaction chambers were plasma treated following the plasma treatment protocol of preparation 2 to provide three reaction chambers with hydrophilic sidewalls. As described in General Procedure 1, TEMED and APS were then mixed with degassed gel solution to initiate polymerization. Gel solution of 800 μL was immediately introduced into each of the six reaction chambers and folded metal wires with a different number of stands (ranging from 2 to 4) were placed into the reaction chambers. The metal wires were not in touch with the solution except for their stands. Reaction chambers were disassembled after 3 hr to release the hydrogel structure.

Through a combination of the bottom-up approach that controls $O_2$ diffusion-regulated polymerization, and the top-down approach that introduces mechanical constraints, we have developed a powerful approach to generate complex 3D architectures, as demonstrated in FIG. 7.

Example 5

Three-Dimensional Architecture Generation (3)

A further strategy to generate complex 3D architectures can be facilitated by regional differential growth of the hydrogel during polymerization. This can be achieved by chemically activating the bottom surface (or any other surface in whole or in part) of the reaction chamber to enhance its adhesion to the hydrogel (e.g. as described in preparation 1 above).

In this example, the activated regions feature a layer of aldehyde groups that can form covalent bonds with the free amine groups in PA hydrogel. The strong adhesion between the hydrogel and the chemically activated bottom surface effectively suppresses the internal growth of hydrogel (FIG. 8).

The protocols for generating the shapes in FIG. 8 are provided below.

For FIG. 8A:

As described in preparation 2, circular patterns (diameters: 11.1 mm and 16.7 mm) were cut out of a 6.35 mm-thick acrylic sheet and glued onto the bottom of a petri dish and PDMS rings with a circular hole were prepared by replica molding the acrylic molds. Four reaction chambers (two each of diameters: 11.1 mm and 16.7 mm) were then prepared by assembling the PDMS ring on top of a glass coverslip. For the top row of FIG. 8A (with surface treatment), the entire area of the glass coverslips used to assemble the reaction chamber were pre-activated by following the protocols described in preparation 1. For the bottom row of FIG. 8A, the reaction chambers were not pre-activated. As described in General Procedure 1, TEMED and APS were mixed with degassed gel solution to initiate polymerization. Gel solutions of 200 μL and 400 μL were immediately introduced into the 11.1 mm and 16.7 mm reaction chambers, respectively. Reaction chambers were disassembled after 3 hr.

As shown clearly in FIG. 8A, the extent of polymerisation product obtained in the reaction chambers subjected to pre-activation (top row FIG. 8A) is significantly less than in those not so treated (bottom row FIG. 8A). Without wishing to be bound by theory, it is believed that a strong adhesion occurs between the hydrogel and the activated bottom surface that effectively suppresses the internal growth of the hydrogel (due to covalent bonding).

For FIG. 8B:

As described in preparation 2, a circular pattern (diameter: 22.2 mm) was cut out of a 6.35-mm-thick acrylic sheet and glued onto the bottom of a petri dish and a PDMS ring with a circular hole was prepared by replica molding the acrylic mold. The PDMS ring was placed on a first glass coverslip and plasma-treated following the protocol described in preparation 2. A reaction chamber was then assembled by detaching the plasma-treated PDMS structure from the first glass coverslip and placing it on top of a second glass coverslip, where the entire area of the second glass coverslip was activated by following the protocol described in preparation 1.

As described in General Procedure 1, TEMED and APS were mixed with degassed gel solution to initiate polymerization and 700 μL of the gel solution was immediately introduced into the reaction chamber. The reaction chamber was disassembled after 3 hr.

As shown clearly in FIG. 8B, a plasma-treated PDMS ring renders the formation of a hydrogel ring. This is because plasma treatment makes the sidewall hydrophilic, leading to a concave profile as demonstrated in FIG. 2. The strong adhesion between hydrogel and activated glass surface suppresses the internal growth of hydrogel and holds the hydrogel in place after disassembling the reaction chamber.

The above techniques were then applied to the manufacture of more complex shapes as demonstrated in FIG. 10. To obtain these materials, we selectively activated the bottom surface of a reaction chamber, such that strong adhesion between hydrogel and bottom surface was possible only within specified regions using the process outlined in cartoon form in FIG. 9. However, it will be appreciated that other surfaces could be activated—either in the same way or by using compatible chemistry for that surface. The process of FIG. 9 comprises of the following steps.

1. A desired branched pattern (10) was cut out of a 6.35-mm-thick acrylic sheet and glued onto the bottom of a petri dish (50) to provide a mold (110). PDMS (20) was poured into the mold and cured as described in preparation 2 above (111). The resulting PDMS ring (112) was removed from the mold.
2. Separately, a glass coverslip (120) was plasma-treated for 1 min using the plasma treatment procedure described in preparation 2, followed by 30 min incubation in 4% 3-aminopropyltrimethoxysilane (APTMS; Sigma-Aldrich) in isopropanol to form an APTMS-activated coverslip (121). The PDMS ring formed in step 1 (112) was placed on the APTMS-activated coverslip (121). The hole in the PDMS ring was then filled with a 1% glutaraldehyde solution (30) and incubated for 30 min, as depicted in (122). Removal of the solution and the PDMS ring (112) yields a glass coverslip (140) that is selectively activated with aldehyde groups (40) on the surface exposed to the glutaraldehyde solution (30) within the PDMS ring.
3. Still separately, a circular pattern (diameter: 22.2 mm) was cut out of a 6.35-mm-thick acrylic sheet and glued onto the bottom of a petri dish (50) to form mold (150). PDMS was poured into the mold (150) and cured as depicted in (151) to provide a cured PDMS ring (method as described in procedure 2), which ring (152) was removed from the mold and placed on the selectively functionalized glass coverslip formed in step 2 (140) to provide a reaction chamber (160).
4. As described in General Procedure 1, TEMED and APS were mixed with degassed gel solution to initiate polymerization. A suitable volume of the resulting gel solution was then immediately introduced into reaction chamber (160) to provide 170. As depicted in 180, strong adhesion between hydrogel and the bottom surface was possible only within the selectively activated surfaces (that is, surfaces that were exposed to the glutaraldehyde solution and therefore contain aldehyde functional groups). After 3 h, removal of the PDMS ring 152 yields a 3D shape (60) as shown in 190, which is influenced by the glutaraldehyde pattern applied to the coverslip.

As shown in FIG. 10, the growing hydrogel forms covalent bonds with the bottom surface within branch patterns, serving as anchoring sites. The continuous growth in the non-adhered regions leads to out-of-plane buckling, rendering 3D buckled hydrogel ring architectures. More complex 3D architectures can be readily generated following this strategy.

The protocols for generating the shapes in FIG. 10 are based on the selective activation process outlined in FIG. 9 and described above.

Three selectively functionalized glass coverslips, having a three-, four- or six-branched pattern, respectively, as shown in the top row of FIG. 10 were prepared by analogy to steps 1 and 2 of the selective activation process outlined for FIG. 9 above. In brief, a PDMS mold for each desired shape was formed and used to confine the glass surface of an APTMS-activated coverslip that is then exposed to the glutaraldehyde solution described above to yield the desired selectively-functionalized patterns.

Circular patterns (diameter: 22.2 mm) were cut out of a 6.35-mm-thick acrylic sheet and glued onto the bottom of a petri dish and three PDMS rings with a circular hole were prepared by replica molding the acrylic mold as described in preparation 2. These PDMS rings were applied to a blank (i.e. unactivated) glass coverslip and subjected to the plasma-treatment procedure described in preparation 2 to change the PDMS surface from hydrophobic to hydrophilic. The resulting plasma-treated rings were removed from the blank coverslip and were then placed on one of the activated glass coverslips described above.

As described in General Procedure 1, TEMED and APS were the mixed with degassed gel solution to initiate polymerization and 700 μL of the gel solution was then immediately introduced into each of the reaction chambers. The reaction chambers were disassembled after 3 hr.

As shown in FIG. 10, the resulting products (bottom panels) have patterns complementary in nature to those of the activated surface generated on the glass coverslips (top panels). Without wishing to be bound by theory, it is believed that a strong adhesion occurs between the hydrogel and the activated bottom surface that effectively suppresses the internal growth of the hydrogel (due to covalent bonding). When only selected regions of the bottom surface of the reaction chamber are activated (e.g. the branch patterns of FIG. 10), the hydrogel forms a covalent bond with the regions in the branch patterns. Given this, the growth of the hydrogel only occurs in the non-adhered regions, leading to the out-of-plane buckling demonstrated in the three 3D buckled ring architectures of the bottom panel in FIG. 10. This allows for more complex 3D architectures to be devised and readily generated.

Example 6

Obtaining Leaf Morphology

Rectangular reaction chambers were constructed by gently pressing a rectangular polydimethylsiloxane (PDMS) ring onto a glass slide in accordance with the technique outlined above in preparation 2. To prepare the mold for making the PDMS ring, rectangular patterns were cut out of a 6.35 mm thick acrylic sheet using a laser cutter (Epilog Laser) and then glued onto the bottom surface of a Petri dish using a two-part epoxy (Gorilla Epoxy; Gorilla Glue Inc.). PDMS rings were prepared using a 10:1 weight mixture of base to curing agent (Sylgard 184; Dow Corning) under the condition mentioned in preparation 2. The resulting cured PDMS was then applied to a glass coverslip to form the reaction chamber, again as described in preparation 2.

Prior to being introduced into the reaction chamber, hydrogel solution of 10% acrylamide and 0.1% bis-acrylamide (Amersco) was degassed for 30 min in a vacuum desiccator to completely remove dissolved oxygen, and cotton wires pre-wetted with hydrogel solution were placed into the reaction chamber as a way to introduce differential growth. The dimension of the rectangular reaction chamber was 34.09 mm in length and 11.35 mm in width. The wire was placed in the middle of the reaction chamber for the manufacture of structures in FIG. 11A, while one wire is placed in the middle and another two wires were placed one on each side with a separation distance of 7.7 mm for the manufacture of structures in FIG. 11B. The wires are cotton threads loosely wrapped with copper wires. The intention was to use copper wires to prevent cotton threads from floating to top of the gel solution. In the meanwhile, the copper wires introduced minimal bending resistance to the deformation of hydrogel. The wires were not anchored into anything. It was the gravity of the copper wires that forced the cotton thread to stay immersed in gel solution. Polymerization was then initiated by introducing tetramethylethylenediamine (TEMED; Teknova) and ammonium persulfate (APS; Promega) into the gel solution with final concentrations of 0.3% and 0.05%, respectively. The gel solution of a desired volume was immediately pipetted into the polymerization chamber with minimal disturbance so as to avoid introducing oxygen. The solution was allowed to react for 1 h before disassembling the reaction chamber to release hydrogel structures.

FIG. 11 shows:

(A) a hydrogel formed with a single point of constraint along the centreline of a rectangular reactor of the type used in this example naturally grows into a twisting configuration (I), and then turns into helical twisting (II) at higher strain level. The higher strain level was induced by the addition of dyed water to swell the hydrogel. The swelling of polyacrylamide hydrogel reaches to its maximum level after several hours. The hydrogel was allowed to swell for overnight to ensure that the swelling process was complete. The amount of water used needs to be able to fully cover the hydrogel; and (B) placing a pair of constraining threads with a separation distance of 0.68 W, the differential strain mismatch induced by polymerization transforms the hydrogel into a saddle bending shape (III). Specifically, the wires are cotton threads loosely wrapped with copper wires. Three wires were used in this setup, where one wire is along the centreline and the other two were placed one on each side with a distance from the centreline at 0.34 W. Further swelling the hydrogel leads to a configuration with wavy edges (IV). The higher strain level was induced by the addition of dyed water in accordance with the procedure mentioned in (A) to swell the hydrogel.

The invention claimed is:

1. A method of forming a 3-dimensional structure from a hydrogel polymerisation solution, the process comprising the steps of:
    (a) placing a hydrogel polymerisation solution into a reaction vessel, where the hydrogel polymerisation solution comprises a solvent, a polymerisation initiator and:
    a monomer, polymer or oligomer and a crosslinking agent chemically compatible with said monomer, polymer or oligomer; and/or
    a polymer or oligomer suitable for self-crosslinking upon exposure to the polymerisation initiator; and
    (b) allowing the hydrogel polymerisation solution to react without mixing for a period of time at ambient temperature, while introducing a polymerisation modulator to the hydrogel polymerisation solution through a hydrogel polymerisation solution/polymerisation modulator interface, wherein
    over the period of time, a modulation effect gradient is established in the hydrogel polymerisation solution, where the modulation effect has a maximal value at the hydrogel polymerisation solution/polymerisation modulator interface and a minimal value at a point furthest away from said interface, wherein one or both of the following apply:
        (i) one or more hydrophilic physical constraint members are added to the reaction vessel in step (a), wherein the one or more hydrophilic physical constraint members reduce growth of polymer in step (b) in a region abutting or adjacent to the one or more hydrophilic physical constraint members; and
        (ii) the reaction vessel has a surface and one or more regions of the surface are treated with a chemical constraint material that reduces or completely inhibits growth of polymer in step (b) on or adjacent to each region of the surface so treated by forming a covalent bond with a growing polymeric material.

2. The method according to claim 1, wherein the reaction vessel has a hydrophobic surface, and one or more regions of the surface are modified to provide a hydrophilic surface.

3. The method of claim 1, wherein the reaction vessel has a hydrophilic surface.

4. The method according to claim 1, wherein the polymerisation modulator is a chemical modulator of the hydrogel polymerisation and the modulation effect gradient is a concentration gradient of the chemical modulator.

5. The method according to claim 4, wherein the chemical modulator is one or more of the group selected from oxygen, a quinone, a phenol, a nitro-containing aromatic compound, a nitroso-containing aromatic compound, iodine or sulphur.

6. The method according to claim 5, wherein the chemical modulator is oxygen.

7. The method according to claim 1, wherein the polymerisation modulator is a temperature at least 10° C. above or below an initial ambient temperature of the polymerisation solution and the modulation effect gradient is a temperature gradient.

8. The method according to claim 1, wherein the monomer is selected from one or more of the group selected from an acrylamide, itaconic acid, 2-acrylamido-2-methylpropane sulfonic acid, a methacrylate, and a methyl ether methacrylate.

9. The method according to claim 1, wherein the polymer or oligomer suitable for crosslinking upon exposure to a polymerisation initiator is selected from one or more of the group consisting of a poly(ethylene glycol diacrylate), a poly(ethylene glycol dimethacrylate), an oligo(ethylene glycol diacrylate), and an oligo(ethylene glycol dimethacrylate).

10. The method according to claim 1, wherein the polymer or oligomer for reaction with a crosslinking agent is selected from oligo(ethylene glycol) methyl ether methacrylate or poly(ethylene glycol) methyl ether methacrylate.

11. The method according to claim 1, wherein the crosslinking agent, when present, is selected from a bisacrylamide, a bisacrylate, and a bismethylate.

12. The method according to claim 1, wherein the hydrogel formed from the hydrogel polymerisation solution is selected from one or more of the group consisting of polyacrylamide, poly(2-acrylamido-2-methyl-1-propanesulfonic acid), poly(itaconic acid), poly(2-acrylamido-2-methyl-1-propanesulfonic acid-co-itaconic acid), poly(2-acrylamido-2-methyl-1-propanesulfonic acid-co-acrylamide), a poly(ethylene glycol diacrylate), a poly(ethylene glycol dimethacrylate), and poly(oligo(ethylene glycol) methyl ether methacrylate-co-2-(2-methoxyethoxy) ethyl methacrylate).

13. The method according to claim 1, wherein each hydrophilic physical constraint member is independently a thread, a wire or a combination thereof.

14. The method according to claim 1, wherein the chemical constraint material provides the one or more surface regions of the reaction vessel with a functional group selected from an aldehyde, a thiol or an acrylate.

15. The method according to claim 1, wherein the reaction vessel is formed from one or more of a glass and a polymeric material.

16. The method according to claim 1, wherein the product of step (b) is further subjected to hydration with water to form a final, hydrated product.

17. The method according to claim 1, wherein the product obtained has a three-dimensional shape that mimics that of a biological tissue.

\* \* \* \* \*